United States Patent [19]
Kawai et al.

[11] Patent Number: 5,895,908
[45] Date of Patent: Apr. 20, 1999

[54] BAR CODE SCANNER WITH LASER POWER DOWN FEATURE

[75] Inventors: Hiroaki Kawai; Shinichi Satoh; Motohiko Itoh; Mitsuo Watanabe; Isao Iwaguchi; Ichiro Shinoda, all of Kawasaki, Japan

[73] Assignee: Fujitsu Limited, Kawasaki, Japan

[21] Appl. No.: 08/726,176

[22] Filed: Oct. 4, 1996

[30] Foreign Application Priority Data

Oct. 25, 1995 [JP] Japan ................... 7-278183

[51] Int. Cl.⁶ .......................................... G06K 19/00
[52] U.S. Cl. ............................ 235/462.3; 235/455
[58] Field of Search ........................... 382/100, 312; 235/455, 462, 454, 470, 462.3

[56] References Cited

U.S. PATENT DOCUMENTS

| | | | |
|---|---|---|---|
| 5,309,962 | 5/1994 | Havens et al. | 235/455 |
| 5,426,288 | 6/1995 | Obata et al. | 235/455 |
| 5,481,096 | 1/1996 | Hippenmeyer et al. | 235/455 |
| 5,528,022 | 6/1996 | Nakazawa | 235/455 |
| 5,581,094 | 12/1996 | Hara et al. | 250/559.38 |
| 5,602,891 | 2/1997 | Kawai et al. | 235/435 |
| 5,616,908 | 4/1997 | Witz et al. | 235/462 |
| 5,648,650 | 7/1997 | Sugifune et al. | 235/455 |
| 5,677,523 | 10/1997 | Coleman | 235/455 |
| 5,724,458 | 3/1998 | Katoh et al. | 382/312 |

*Primary Examiner*—Anita Pellmann Gross
*Assistant Examiner*—Drew A. Dunn
*Attorney, Agent, or Firm*—Nikaido, Marmelstein, Murray & Oram LLP

[57] ABSTRACT

A proximity sensor receives light beams reflected from a goods. A proximity sensor control unit determines that the goods exists when a light quantity of the reflected light received by the proximity sensor exceeds a determination threshold value. The determination threshold value increases as elapsed time since the bar code was read last time becomes longer, and, as a result, a detection sensitivity decreases. A CPU restores a duty of irradiation of the laser beam back to 100% and resumes rotations of a motor for driving an operation optical system when the proximity sensor control unit determines that the goods exists.

14 Claims, 18 Drawing Sheets

| y \ x | 1 | 2 | 3 |
|---|---|---|---|
| 1 | 10 % | 20 % | 50 % |
| 2 | 20 % | 30 % | 50 % |
| 3 | 30 % | 40 % | 50 % |
| 4 | 40 % | 50 % | 50 % |
| 5 | 50 % | 50 % | 50 % |

| y \ x | 1 | 2 | 3 |
|---|---|---|---|
| 1 | 90 % | 80 % | 50 % |
| 2 | 80 % | 70 % | 50 % |
| 3 | 70 % | 60 % | 50 % |
| 4 | 60 % | 50 % | 50 % |
| 5 | 50 % | 50 % | 50 % |

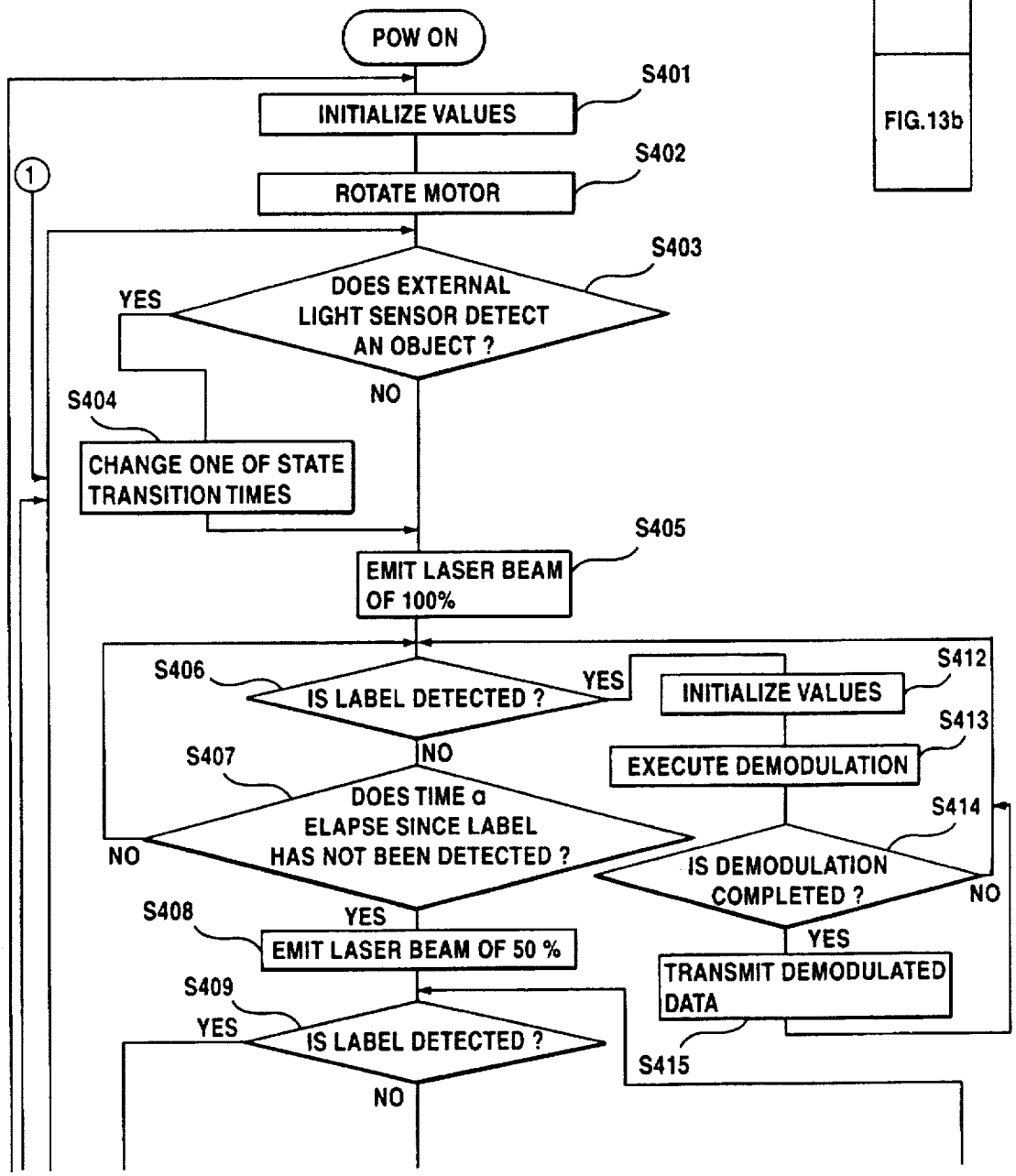

BAR CODE SCANNER WITH LASER POWER DOWN FEATURE

BACKGROUND OF THE INVENTION

1. Field of the Invention

The present invention relates generally to a bar code reading apparatus for detecting variations in intensity of reflected light from a bar code which is irradiated with laser beams scanned by a scanning optical system. The present invention relates more particularly to a bar code reading apparatus which can automatically decrease intensity of the laser beams and stop the scanning by the scanning optical system when unused.

2. Description of the Prior Art

A practice of managing merchandise and inventory by using bar codes has been popularized in recent years as represented, for example by a POS (point-of-sale); system in a distribution business. For example, in a POS system of a retail store, items of data such as kinds, sales prices, of the goods, etc. are encoded in a bar code format, and the encoded bar code is printed on the goods or printed on a lable affixed to the goods. Then, the bar code is read at a cash register, or posterminal and the payment of the goods is made based on the read data. Subsequently, the numbers of sales of the goods are determined in real time, which can be useful for stocking, inventory, and purchasing management.

By the way, the above bar code reading apparatus for reading the bar code can be classified into a fixed type used when the goods are relatively small and a hand-held type used when the goods are relatively large. The fixed type involves the use of a mechanism for scanning the bar code with irradiated light beams in multi-directions so that the bar code can be read even when the goods are set over the bar code reader without an operator being aware of a direction of the bar code. More specifically, the fixed type uses a polygon mirror and fixed reflecting mirrors in combination. Laser beams acting as reading irradiated light beams are reflected by a single reflection surface of the polygon mirror, during which these reflected light beams are sequentially incident upon a plurality of fixed reflecting mirrors in order and deflected in a variety of directions for scanning. The bar code reading apparatus receives the reflected light beams from the surface of the goods during such scanning, and decodes the data encoded in the bar code on the basis of variations in intensity of the received light beams.

In this fixed type bar code reader, a laser diode used as a laser light source naturally has a finite usable life. Accordingly, if an emission of the laser beams continues even in a standby where the reading of the bar code is not yet carried out although a power is supplied to the laser reading apparatus, the laser diode might require frequent replacement. Similarly, if the optical scanning system is constantly driven, a fault is more likely to occur, and a large quantity of electric power is unnecessarily dissipated.

Conventional bar code reading devices have attempted to solve these problems by utilizing a trigger switch or an item sensor in the vicinity of a bar code reading position (which may be an external surface of a glass plate inset in an outer wall of the bar code reading apparatus so that the laser beams penetrate it toward the outside). In the conventional bar code reading apparatus, an optical scanning system is driven and the laser beams are emitted only when the goods is detected by the trigger switch or the item sensor.

However, in cases where the goods are mechanically detected by the trigger switch or the item sensor, the operator must take steps to make the goods contact with the trigger switch or the item sensor. Hence, the operator has to perform the reading operation while being aware of the trigger switch or the item sensor.

SUMMARY OF THE INVENTION

It is a first object of the present invention, which was contrived in view of the above problems inherent in the prior art, to provide a bar code reading apparatus capable of efficiently starting an emission of laser beams and starting the drive of a scan optical system without making a user aware of an existence of a sensor. The invention has a construction which can optically detect an object marked with a bar code.

If a detecting apparatus for detecting an existence of an object in the vicinity of the bar code reading position based on from variations in a received light quantity is used, the apparatus can be offered at a low price. However, in this case, the object which detected is not always necessarily a commercial goods or an item which is intended to be scanned. By the way, if a time period since the goods has been once detected is short, there is a high possibility that the goods may be re-detected. Further, even if the irradiation of the laser beams and the drive of the scan optical system are restarted due to a misdetection, and if the goods is exposed to the laser beam in the bar code reading position during the restarted irradiation of the laser beams, this resumption of the irradiation of the laser beam is not useless.

It is a second object of the present invention to provide a bar code reading apparatus that decreases a sensitivity when detecting an object in accordance with a length of a time period for which the reading of the-bar code is interrupted after once reading the bar code to reduce troubles or errors caused by the misdetection.

To accomplish the first and second objects of the invention, a bar code reading apparatus according to the present invention adopts the following constructions.

In a first aspect of a bar code reading apparatus of the present invention, a bar code reading apparatus comprises. A laser light source for emitting laser beam, a scan optical system is provided for deflecting the laser beams toward a read position, and a demodulating element is provided for demodulating data encoded in a bar code marked on an object disposed in the read position on the basis of a reflected beam of the laser beam reflecting on the bar code. The bar code reading apparatus also comprises a power changing element for changing power of the laser beam from a normal level after a predetermined time has elapsed since the demodulating element performed the demodulation last time, and an optical sensor optically detecting an object disposed in the read position. The bar code reading apparatus further comprises a restoring element for restoring the power of the laser beams to the normal level when the optical sensor detects an object, and a sensitivity decreasing element for decreasing a sensitivity of the optical sensor in accordance with the elapsed time since the demodulating element performed the demodulation last time.

According to the first aspect of the bar code reading apparatus of the present invention, the laser light source emits the laser beam. The scan optical system rotates and deflect the laser beams toward the read position. The demodulating element detects the reflected beam of the laser beam reflected on the bar code marked on the object disposed in the read position, and demodulates the data encoded in the bar code. The power changing element changes power of the laser beam emitted from the laser light source from the normal level after the predetermined time has elapsed since the demodulating element performed the demodulation last time. The optical sensor optically detects an object disposed in the read position. When the optical sensor detects an object, the restoring element restores the power of the laser beams emitted from the laser light source to the normal level. The sensitivity decreasing element decreases the sensitivity of the optical sensor in accordance with the elapsed time since the demodulating element performed the previous demodulation. Accordingly, when the elapsed time since the demodulation has been previously performed is not so long, there must be a relatively small -possibility of misdetecting an object other than the object marked with the bar code even if the detection sensitivity is increased because of such a high possibility that the bar code can be read. Further, it is possible to prevent a failure of detecting the object marked with the bar code by increasing the detection sensitivity. Moreover, when the elapsed time since the demodulation was carried out last time is extended the possibility of the bar code being read is reduced. Therefore, it is feasible to minimize the possibility of misdetecting the object excluding the object marked with the bar code with the sensitivity decreased. The The laser light source may be a semiconductor laser, i.e., a laser diode or a solid-state laser.

The read position defines an are a in which the bar code can be read as far as the bar code exists in the particular position. The read position may be set upwardly of the scan optical system or may be set sideways of the scan optical system. Further, there may be provided a wall surface, e.g., a glass window, which defines a boundary surface of the read position.

The scan optical system is an optical system including a polygon mirror or a galvano mirror capable of deflecting the laser beams by its rotation.

The demodulating element can be constructed to detect the variations in the intensity of the reflected light beams from the bar code, to measure a width of each of bars constituting the bar code on the basis of the variations in the intensity thereof, to read the a pattern of the bar code on the basis of the bar widths measured, and convert the thus read pattern into corresponding data.

The power changing element is an element for changing a magnitude of the power of the laser beam. This "change" includes changing the magnitude thereof without stopping the emission of the laser beams or completely stopping emission of the laser beams. Further, the power changing element may consecutively gradually change the magnitude of the power or may stepwise change it at fixed time interval. This "change" includes an attenuation of an instant value itself of the laser beam or reducing duty of emission of a laser beam in the unit time.

The optical sensor may have a construction wherein a light emitting element and a light receiving element are disposed side by side fronting the read position, whereby an object is detected on the assumption that an object exists when receiving the reflected light beams from the surface of the object. The optical sensor may also have a construction wherein the light emitting element and the light receiving element are disposed with the read position interposed therebetween, whereby an object is detected on the assumption that an object exists when the light beams emitted from the light emitting element and incident upon the light receiving element are intercepted by the object. In those cases, it is desirable that-a light receiving surface of the light receiving element is covered with a filter which transmits only the light beams having a specified wavelength that is same as that of the laser beam emitted from the light emitting element so that the variations in the external light beams do not exert any influence on a result of the detection. Further, the optical sensor may take such a construction that only the light receiving element is disposed to front the read position, whereby an object is detected on the assumption that an object exists when the external light beams incident upon the light receiving element via the read position are intercepted by the object. In this case, it is desirable that a frequency characteristic of the light receiving element be flat in a visible area.

The restoring element restores the power of the laser beams to a level of a status before the power changing element changes the magnitude of the power. The restoring element may restore the magnitude of the power of the laser beams also when the demodulating element demodulates the bar code or when the optical sensor detects an object.

The sensitivity decreasing element may consecutively gradually decrease the sensitivity or may stepwise decrease the sensitivity at an interval of a fixed time. In the case of decreasing the sensitivity stepwise at the interval of the fixed time, this process may be execute in synchronization with the stepwise changing of the power by the power changing element. The sensitivity decreasing element desirably sets the sensitivity of the optical sensor back to the previous sensitivity when the restoring element restores the power of the laser beams.

In a second aspect of the bar code reading apparatus of the present invention, a bar code reading apparatus comprises a laser light source for emitting a laser beam. A scan optical element rotates to deflect the laser beam toward a read position, and a driving element drives the scan optical element. A demodulating element a demodulating element demodulates data encoded in a bar code marked on an object disposed in the read position on the basis of a reflected beam of the laser beam reflected on the bar code. The bar code reading apparatus also comprises a control element for at first changing power of the laser beam from a normal level, then stopping an emission of the laser beams from the laser light source. Subsequently, the driving of the scan optical element by the driving element is stopped in accordance with an elapsed time since the demodulating element previously performed the demodulation. The bar code reading apparatus further comprises an optical sensor optically detecting an object disposed in the read position, a restoring element for restoring the power of the laser beams to the normal level, and restoring the driving of the scan optical element by the driving element when the optical sensor detects an object. A sensitivity decreasing element decreases stepwise sensitivity of the optical sensor respectively when the power of the laser beams is changed from the normal level, when the emission of the laser beams is stopped, and when the driving of the scan optical member is stopped.

According to the second aspect of the bar code reading apparatus of the present invention, the laser light source emits the laser beams. The rotating scan optical element rotates and deflects the laser beams toward the read position. The driving element rotationally drives this scan optical element. The demodulating element demodulates the data encoded in.the bar code on the basis of the reflected light beams of the laser beams falling on the bar code marked on the object disposed in the read position. The control element at first changes the power of the laser beams emitted from the laser light source from the normal level, then stops the emission of the laser beams emitted from the laser light source, and subsequently stops the driving of the scan optical element by the driving element, in accordance with the elapsed time since the demodulating element previously performed the demodulation. The optical sensor optically detects an object disposed in the read position. The restoring element, when the optical sensor detects the object, restores the power of the laser beams emitted from the laser light source to the normal level and restores the driving of the scan optical element by the driving element. The sensitivity decreasing element, when the power of the laser beams is chreduces the sensormal level, reduces the sensitivity of the optical sensor by one step. The sensitivity decreasing element, when the emission of the laser beams is stopped, reduces the sensitivity by. further one step. The sensitivity decreasing element, when the drive of the scan optical element is stopped, further reduces the sensitivity by one step. When the power of the laser beams is simply changed, there must be a comparatively low possibility of misdetecting the object other than the object marked with the bar code even if the detection sensitivity is high because of such a high possibility that the bar code can be read. Furthermore, it is feasible to prevent a failure of detection the object marked with the bar code by increasing the sensitivity. Additionally, when the emission of the laser beams is simply stopped, there is decreased a possibility that the bar code can be, read, and it is therefore feasible to restrain the possibility of misdetecting the object other than the object marked with the bar code by reducing the sensitivity. Further, when the driving of the optical element is also halted, the possibility that the bar code can be read is further decreased, and hence it is feasible to restrain the possibility of misdetecting the object other than the object marked with the bar code by further reducing the detection sensitivity.

The scan optical element is a polygon mirror or galvano mirror capable of deflecting the laser beams by its rotation.

According to a third aspect of the bar code reading apparatus of the present invention, a bar code reading apparatus further comprises a frequency measuring element for measuring a frequency at which the demodulating element demodulates the data. The sensitivity decreasing element decreases the sensitivity by the optical sensor each time the frequency measured by the frequency measuring element decreases and increases the detection sensitivity by the optical sensor each time the frequency increases. If a data demodulation frequency is high, the possibility of reading the bar code is high, and hence, even if the sensitivity is high, there must be a comparatively low possibility in which the object other than the object marked with the bar code is misdetected. Moreover, the failure of detecting the object marked with the bar code is prevented by increasing the sensitivity. Furthermore, if the data demodulation frequency is low, the possibility of misdetecting the object other than the object marked with the bar code is restrained by decreasing the sensitivity is low since there must be a low possibility of reading the bar code.

According to a fourth aspect of the bar code reading apparatus of the present invention, the sensitivity decreasing element includes a table in which a combination of the elapsed time since the demodulating element executed the demodulation last time and the frequency measured by the frequency measuring element is made to correspond to sensitivity of the-optical sensor and reads the sensitivity out this table. If the table is thus, prepared, an optimum sensitivity can be easily set in consideration of the-elapsed time and the frequency in use.

According to a fifth aspect of the bar code reading apparatus of the present invention, the optical sensor includes a light emitting element for irradiating an object disposed in the read position with the light beams and a light receiving element for receiving the light beams reflected from the object. The light emitting element and light receiving element are disposed side by side.

According to a sixth aspect of the bar code reading apparatus of the present invention, the optical sensor detects external light incident via the read position which is intercepted by the object.

According to a seventh aspect of the bar code reading apparatus of the present invention, the optical sensor compares an average of light quantities obtained by measuring the external light beams several times with a latest external light quantity. The optical sensor assumes an object detected when a rate of the latest external light quantity to the average is a predetermined level or under. With this construction, there is no necessity of setting a fixed determination reference value, and hence the object can be detected irrespective of a brightness of a place where the bar code reading apparatus is employed.

According to an eighth aspect of the bar code reading apparatus of the present invention, an external light quantity measurement interval for obtaining the average is set larger that a measurement interval for measuring the latest external light quantity.

According to a ninth aspect of the bar code reading apparatus of the present invention, the average of light quantities obtained by measuring the external light beams several times is compared with a second average of light quantities obtained by measuring the latest external light quantities several times. If constructed in this way, an influence by an instant value which has no direct connection with an actual detection of the object can be effectively eliminated.

According to a tenth aspect of the bar code reading apparatus of the present invention, the power changing element changes a power of the laser beams only when the average of the light quantities obtained by measuring the external light am several times is less than a predetermined level. With this construction, when the average value of the external light quantity is equal to or more than the predetermined value, the power of the laser beams can be kept, and hence there is no necessity for detecting the variations in the external light beams. Accordingly, the optical sensor is prevented from misdetecting the object.

According to an eleventh aspect of the bar code reading apparatus of the present invention, the power changing element changes power of the laser beams only when the average of the light quantities obtained by measuring the external light beams several times is larger than a predetermined level. Due to this construction, if the average quantity of the external light quantity is equal to or more than the predetermined value, the power of the laser beams can be maintained, and hence, there is no necessity for detecting the variations in the external light beams. Accordingly, misdetection of the object by the optical sensor is prevented.

In a twelfth aspect of the bar code reading apparatus of the present invention, a bar code reading apparatus comprises a laser light source for emitting laser beam, a scan optical system deflecting the laser beams toward a read position, and a demodulating element for demodulating data encoded in a bar code marked on an object disposed in the reading position on the basis of a reflected beam of the laser beam reflected on the bar code. The bar code reading apparatus also comprises a power changing element for changing power of the laser beam from a normal level after a predetermined time has elapsed since the demodulating element performed the demodulation last time, an optical sensor for optically detecting the object disposed in the read position, and a restoring element for restoring the power of the laser beams to the normal level when the optical sensor detects an object. The bar code reading apparatus further comprises a sensitivity decreasing element for decreasing sensitivity of the optical sensor in accordance with the number of times with which the optical sensor detects an object without any demodulation executed by the demodulating element.

According to the twelfth aspect of the bar code reading apparatus of the present invention, the laser light source emits the laser beam. The scan optical system relates and deflects the laser beams toward the read position. The demodulating element demodulates the data encoded in the bar code on the basis of the reflected light of the laser beams reflected on the bar code marked on the object disposed in the read position. The power changing element changes power of the laser beam emitted from the laser light source from the normal level after the predetermined time has elapsed since the demodulating element performed the demodulation last time. The optical sensor optically detects an object disposed in the read position. When this optical sensor detects an object, the restoring element restores the power of the laser beam emitted from the laser light source to the normal level. The sensitivity decreasing element decreases the sensitivity of the optical sensor in accordance with the number of times with which the optical sensor detects the object without any demodulation performed by the demodulating element. Immediately after effecting the demodulation, there must be a high possibility that the bar code can be read. Hence, even if the detection sensitivity is set high, there must be a comparatively low possibility of misdetecting the object other than the object marked with the bar code. Further, the failure of detecting the object marked with the bar code is prevented by increasing the detection sensitivity. Contrastingly, the case that the optical sensor detects an object without any demodulation executed by the demodulating element is misdetection, and therefore, the possibility of misdetecting the object other than the object marked with the bar code is restrained by decreasing the detection sensitivity.

In a thirteenth aspect of the bar code reading apparatus of the present invention, a bar code reading apparatus comprises a laser light source for emitting a laser beam, a scan optical element rotating to deflect the laser beam toward a read position, a driving element for driving the scan optical element, and a demodulating element for demodulating data encoded in a bar code marked on an object disposed in the read position on the basis of a reflected beam of the laser beam reflected on the bar code. The bar code reading apparatus also comprises a control element for at first changing power of the laser beam from a normal level, next stopping an emission of the laser beam from the laser light source, and subsequently stopping the driving of the scan optical element by the driving element in accordance with an elapsed time since the demodulating element performed the demodulation last time. The bar code reading apparatus further comprises an optical sensor for optically detecting an object disposed in the read position, a restoring element for restoring the power of the laser beams to the normal level, and resetting the drive of the scan optical element by the driving element when the optical sensor detects an object, and a time shortening element for shortening a time until the emission of the laser beams is stopped when the being optical sensor detects an object without any demodulation executed by the demodulating element.

According to the thirteenth aspect of the bar code reading apparatus of the present invention, the laser light source emits laser beams. The scan optical element rotates and deflects the laser beams toward the read position. The driving element rotationally drives the scan optical element. The demodulating element demodulates the data encoded in the bar code marked on the object disposed in the read position on the basis of reflected beams of the laser beams reflected on the bar code. The control element at first changes the power of the laser beams emitted from the laser light source from the normal level, next stops the emission of the laser beams emitted from the laser light source, and subsequently stops the driving of the scan optical element by the driving element, in accordance with the elapsed time since the demodulating element performed the demodulation last time. The optical sensor optically detects an object disposed in the read position. The restoring element restores the power of the laser beams emitted from the laser light source to the normal level, and restores the driving of the scan optical element by the driving element when the optical sensor detects the object. The time shortening element shortens a time until the emission of the laser beams emitted from the-laser light source is stopped when the optical sensor detects an object without any demodulation executed by the demodulating element. Since the case that the optical sensor detects an object without any demodulation effected by the demodulating element is misdetected, the laser beams are prevented from being emitted with a futility by reducing the time until the output of the laser beams is stopped in such a case.

In a fourteenth aspect of the bar code reading apparatus of the present invention, a bar code reading apparatus comprises a laser light source for emitting a laser beam, a scan optical element rotating to deflect the laser beam toward a read position, a driving element for driving the scan optical element, and a demodulating elements for demodulating data encoded in a bar code marked on an object disposed in-the read position on the basis of a reflected beam of the laser beams reflected on the bar code. The bar code reading apparatus also comprises a control element for at first changing power of the laser beam from a normal level, then next stopping an emission of the laser beam from the laser light source. Subsequently, the driving of the scan optical element by the driving element is stopped in accordance with an elapsed time since the demodulating element performed the demodulation last time. The bar code reading apparatus further comprises an optical sensor optically detecting an object disposed in the read position, a restoring element for restoring the power of the laser beam to the normal level, and restoring the driving of the scan optical element by the driving element when the optical sensor detects an object. The bar code reading apparatus further comprises a time shortening element for shortening, when the optical sensor. detects an object without any demodulation executed by the demodulating element, a time until power of the laser beam is changed, a time until the emission of the laser beam is stopped, and a time until the driving of the scan optical element by the driving element is stopped.

According to the fourteenth aspect of the bar code reading apparatus of the present invention, the laser light source emits laser beams. The scan optical element rotates and deflects the laser beams toward the-read position. The driving element rotationally drives the scan optical element. The demodulating element demodulates data encoded in the bar code marked on an object disposed in the read position on the basis of reflected light beams of the laser beams reflected on the bar code. The control element at first changes the power of the laser beams emitted from the laser light source from the normal level, next stops an emission of the laser beams emitted from the laser light source, and subsequently stops the driving of the scan optical element by the driving element, in accordance with an elapsed time since the demodulating element performed the demodulation last time. The optical sensor optically detects an object disposed in the read position. The restoring element restores the power of the laser beams emitted from the laser light source to the normal level, and restores the driving of the scan optical element by the driving element, when the optical sensor detects the object. The time shortening element shortens, when the optical sensor detects an object without any demodulation executed by the demodulating element, a time until the power of the laser beams emitted from the laser light source is changed, a time until the emission of the laser beams emitted from the laser light source is stopped. The time shortening element also shortens a time until the driving of the scan optical element by the driving element is stopped. Beams are prevented from being, unnecessary emitted with the time is reduced until the driving of the, scan optical element is stopped, whereby the scan optical member is prevented from being unnecessarily driven by the driving element.

BRIEF DESCRIPTION THE DRAWINGS

The present invention will become more fully understood from the detailed description given hereinbelow and the accompanying drawings which are given by way of illustration only, wherein.

DESCRIPTION OF THE PREFERRED EMBODIMENTS

Next, embodiments of the present invention will, hereinafter be discussed with reference to the (Whole Construction of Bar Code Reading Apparatus)

Figure 1:
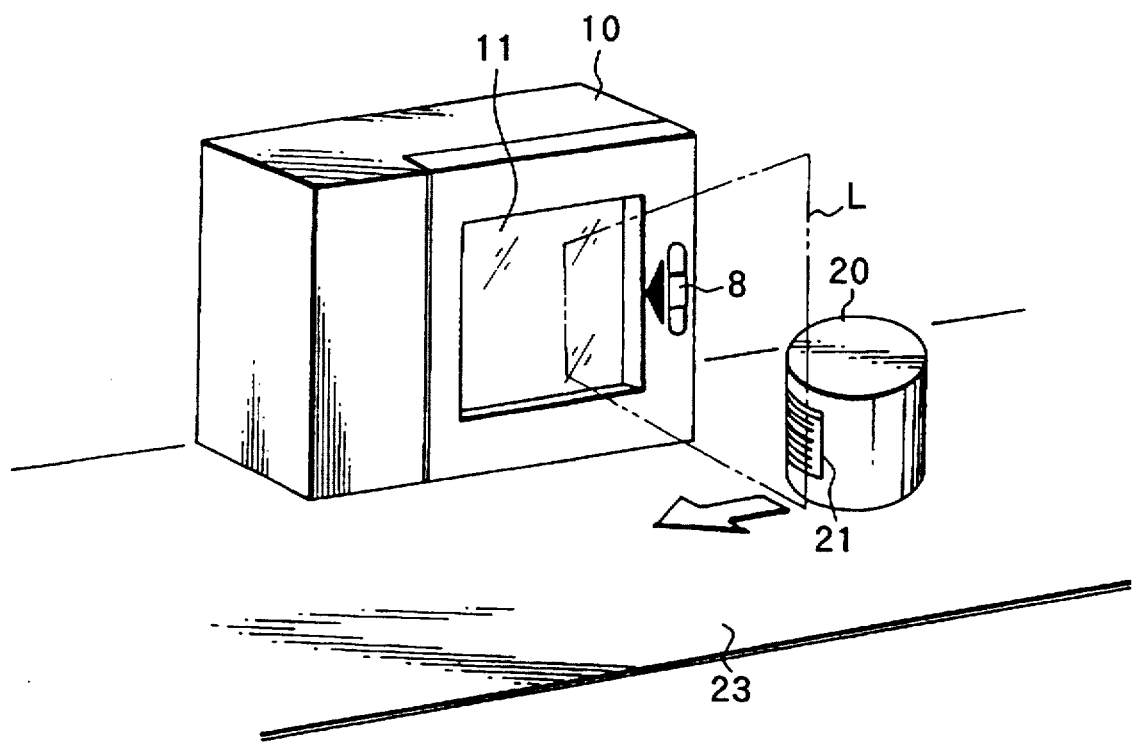
FIG. 1 is a perspective view illustrating a bar code reading apparatus in a first embodiment of the present invention.

FIG. 1 is a perspective view showing an appearance of a bar code reading apparatus in accordance with a first embodiment of the present invention. Referring to FIG. 1, a bar code reading apparatus 10 is constructed on an upper surface 23 of a cash register apparatus for, as an example a supermarket. This upper surface 23 is formed as a flat surface enabling a user to slidably move a goods 20 in an arrowed direction (from right to left in FIG. 1) by hand. The bar code reading apparatus 10 is disposed at a side edge portion of the supper surface 23 of the cash register apparatus so that a surface formed with a glass window 11 fronts a central portion of the upper surface 23, whereby the bar code reading apparatus 10 is capable of reading a bar code 21 printed on the surface of the goods 20 that is slidably moved. More specifically, the glass window formed in the bar code reading apparatus 10 transmits laser beams L, with which the goods 20 is scanned in a vertical direction, emitted toward the central portion of the supper surface 23 of the cash register apparatus. The same glass window 11 also transmits the laser beams L reflected from the surface of the goods 20 toward an interior thereof.

Further, a proximity sensor 8 is provided on the right side (i.e., on an upstream side of the sliding moving direction as indicated by an arrow of the goods) of the glass window 11 and in a position having the same height as the mid-part of the glass window 11. This proximity sensor 8 is constructed of a light emitting diode for emitting infrared rays having a specified wavelength toward the central portion of the upper surface 23 of the cash register apparatus, and of a photo diode covered with a filter that transmits only the light beams having that specified wavelength. These diodes are arranged in a side-by-side relationship. The proximity sensor 8, when an object (such as the goods 20, etc.) is placed on the upper surface 23 of the cash register apparatus in front of this proximity sensor 8, receives the infrared rays having the specified wavelength, which are emitted from the light emitting diode and reflected from the surface of the object. The proximity sensor thus detects an existence of this object. Namely, the proximity sensor 8 is defined as a reflection type optical sensor.

Figure 2:
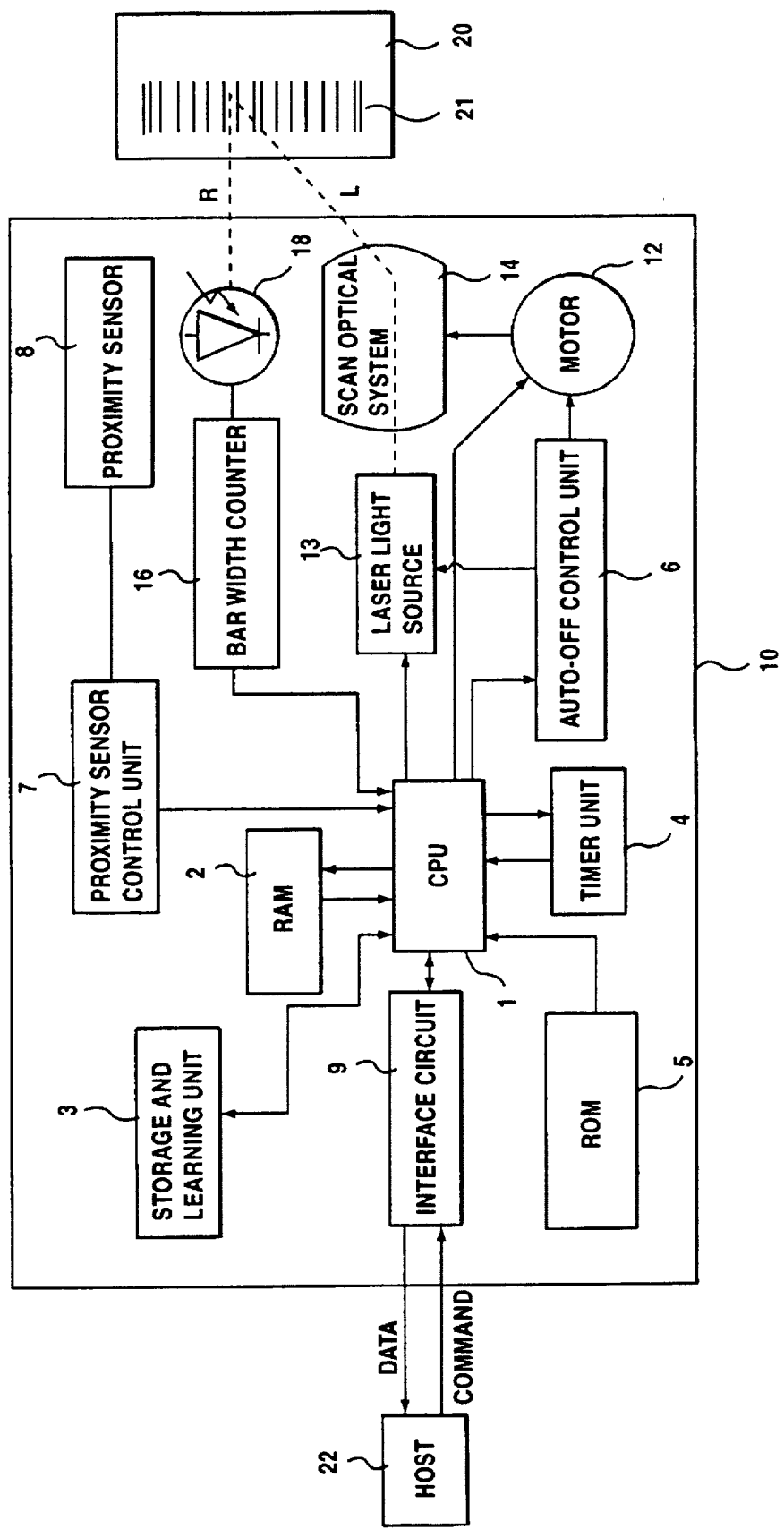
FIG. 2 is e block diagram illustrating an internal circuit of the bar code reading apparatus shown in FIG. 1.

Next, internal circuits of the bar code reading apparatus 10 will be explained with reference to the block diagram of FIG. 2. Connected to the proximity sensor 8 is a proximity sensor control unit 7 to which a CPU 1 is connected. Connected additionally to the CPU 1 are a RAM 2, a storage and learning unit 3, a timer unit 4, a ROM 5, an auto-off control unit 6, an interface circuit 9, a motor 12, a laser light source 13 and a light receiving element 18.

The above-mentioned proximity sensor control unit 7 supplies the light emitting diode of the proximity sensor 8 with a driving electric current. The proximity sensor control unit 7 always monitors a photo current of the photo diode of the proximity sensor 8 and checks whether this photo current exceeds a predetermined threshold value. Then, if the photo current exceeds the predetermined threshold value, the proximity sensor control unit 7 notifies the CPU 1 of the effect that the object (such as the goods 20, etc.) exists in front of the proximity sensor 8. The above threshold value is not constant or fixed, but is variable corresponding to an instruction given from the CPU 1. As a result, if the threshold value goes higher, a determination that the object must exist is harder to be made, and a detection sensitivity decreases. Contrastingly, if the threshold value goes lower, the determination that the object must exist is easier to be made, and the detection sensitivity increases.

Figures 5, 6:
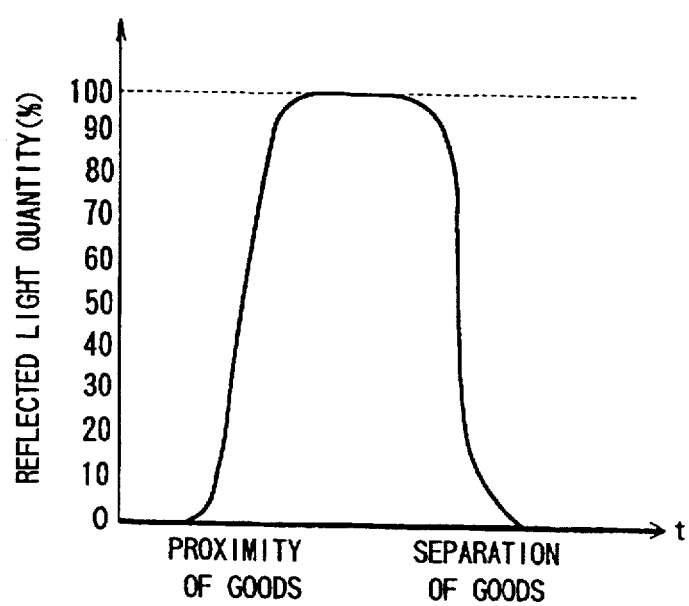
FIG. 5 is a determination threshold value table stored in a ROM shown in FIG. 2.
FIG. 6 is an explanatory diagram showing variations in reflected light quantity.

A variable range of the threshold value will be explained with reference to FIG. 6. Now, it is assumed that the goods 20 exhibiting a high surface reflectivity is placed on the upper surface 23 of the cash register apparatus in front of the proximity sensor 8. At this time, if a quantity of light received by the photo diode of the proximity sensor 8 is conceived as a maximum light quantity receivable by the same photo diode, the photo current outputted from the photo diode can be conceived to have a maximum value of the photo current that can be outputted from the same photo diode. Accordingly, the quantity of the light (which is the photo current) received at that time can be conceived as a 100% light quantity as illustrated in FIG. 6. The threshold value set in the proximity sensor control unit 7 is set lower than 100% in consideration of a case where the surface reflectivity of the goods is low, a case where the surface of the goods is an irregular reflecting surface, and a case where the surface of the goods is obliquely directed to the proximity sensor. On the other hand, if the threshold value is set too low, it follows that even the light beams reflected from clothing of an operator standing in front of the cash register apparatus and from a wall might be detected. It is therefore impossible to set the threshold value too low. Taking the above-mentioned into consideration, in accordance with this embodiment, the determination threshold value in the proximity sensor control unit 7 is set in the vicinity of values of 10%–50%. This value of 50% is the maximum threshold value with which the existence of the goods can be checked even if the surface reflectivity of the goods is low or if the goods is placed in an oblique direction, as far as the goods exists in front of the proximity sensor 8 on the cash register apparatus surface 23. Further, the value of 10% is the minimum threshold value with which to prevent a detection of the reflected light beams from the wall and from the clothing of the operator standing in front of the cash register apparatus. Those values only 10%–50% are, however, of one example of the set values, and values other than those values may be set depending on conditions.

The motor or driving element 12 rotates a polygon mirror (not shown) which is a scan optical member constituting the scan optical system 14. Further, the laser light source 13 is defined as a laser diode for emitting the laser beams L. The laser beams L emitted from the laser light source 13 fall upon the scan optical system 14 by which the laser beams are deflected. Scans using the laser beams L are performed by the polygon mirror rotationally driven by the motor 12 within the scan optical system 14. When the laser beams L used for the scan fall on the surface (including the bar code 21) of the goods 20, the laser beams L are irregularly reflected at this surface, and some of the reflected light beams R are received by the light receiving element or photo diode 18. A bar width counter 16 measures a width of each of bars constituting the bar code 21 on the basis of variations in intensity of the photo current outputted from the light receiving element 18 and calculates an item of data (which is hereinafter termed "bar width data") corresponding to this measured bar width.

Further, the CPU 1 controls the whole bar code reading apparatus and also demodulates the data encoded in the bar code 21 on the basis of the bar width data outputted from the bar width counter 16. Moreover, the CPU 1 changes the determination threshold value set in the above proximity sensor control unit 7 in accordance with a predetermined algorithm, and also issues a control instruction to the auto-off control unit 6. Namely, the CPU 1 constitutes a demodulating element in combination with the light receiving element 18 and the bar width counter 16. Further, the CPU 1 also corresponds to a control element, a restoring element (which is an restoring element), a sensitivity decreasing element and a time setting element.

The ROM 5 is a read-only memory stored with programs for a bar code demodulating process and a determination threshold value changing process that are executed by the CPU 1 and with a determination threshold value table shown in FIG. 5. This determination threshold value table is a table in which combinations of a variable x and a variable y are made corresponding to the determination threshold values.

The interface circuit 9 is an input/output circuit for connecting the CPU 1 to a host computer 22 installed in a computing center. The interface circuit 9 makes the CPU 1 to be inputted with a control command from the host computer 22 and transmits the data from the CPU 1 to the host computer 22.

The timer unit 4 is a hardware for generating time data used for the determination threshold value changing process executed by the CPU 1.

The RAM 2 is a memory for temporarily storing the data demodulated as a result of the bar code demodulating process executed by the CPU 1.

The storage and learning unit 3 is a memory for storing a frequency in use of the bar code demodulating apparatus 10. This frequency is indicated with the number of bar codes demodulated by the CPU 1 within a fixed period.

The auto-off control-unit, or power changing 6 reduces a duty of irradiation of the laser beams L emitted from the laser light source 13 by half, completely stops the emission thereof and halts the rotations of the motor 12 in accordance with the control of the CPU 1. Note that the "duty of irradiation" herein indicates a ratio of time for which the laser beams L are irradiated within a unit time. Hence, a duty of irradiation of 50% indicates that the laser beams L are evenly turned ON-OFF at an equal interval of a minute time. The duty of irradiation is thus reduced, so that the output of the laser beams L within the unit time is attenuated.

If the auto-off control unit 6 completely stops the laser beams L, the laser light source 13 is supplied with absolutely no driving current, so that unnecessary dissipation of the electric power is thereby prevented. If the duty of irradiation of the laser beams L is reduced down to 50%, a usable life of the laser light source 13 is extended. In this case, the laser light source 13 remains in an excited state, and therefore, when the proximity sensor 8 detects the goods 20, the duty of irradiation of the laser beams L is immediately returned to 100% with the result that stable irradiation of the laser beams L is performed.

Next, there will be described processes for the bar code demodulation and changing the determination threshold value, which are executed by the CPU 1 with reference to flowcharts of FIGS. 3 and 4. The processes shown in the flowcharts of FIGS. 3 and 4 respectively start with a power supply to the bar code reading apparatus, which executed virtually in parallel.

Figure 3:
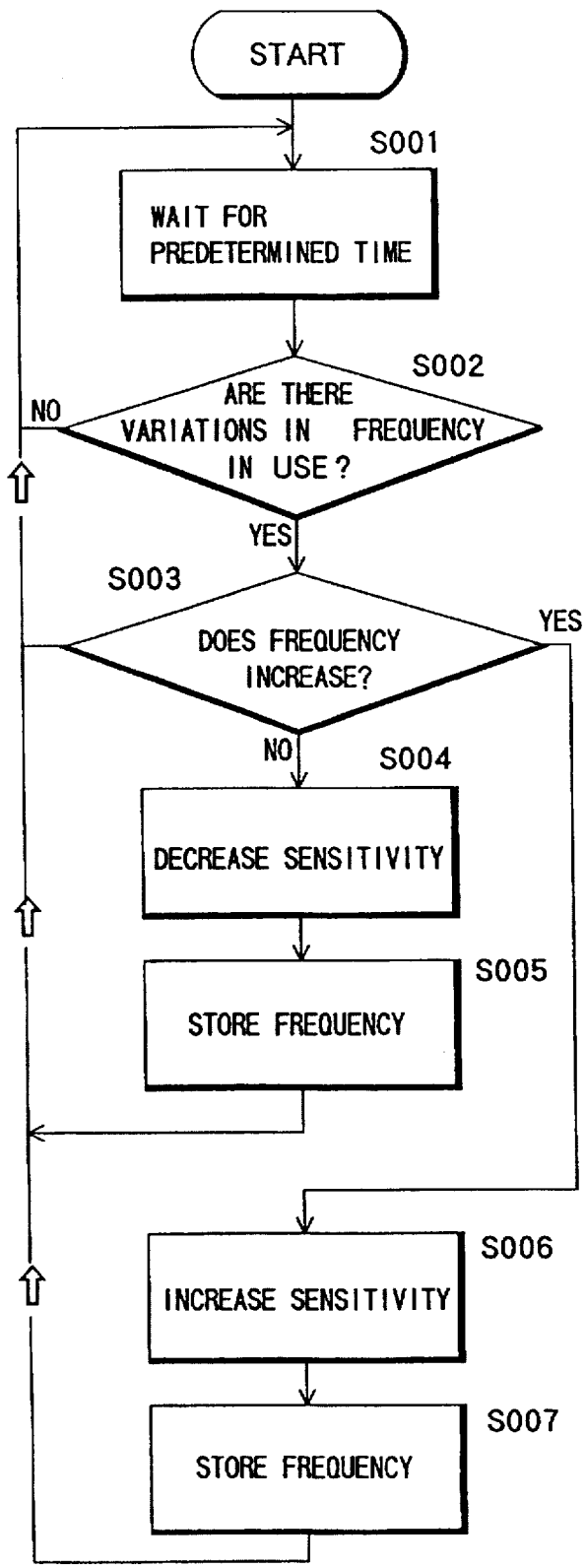
FIG. 3 is a flowchart showing a using frequency detecting process executed by a CPU shown in FIG. 2.

FIG. 3 shows the processes for measuring the frequency in use at the interval of a fixed time (e.g., 10 minutes), and comparing the frequency now measured with the frequency that has been recently stored in the storage learning unit 3. The variable y is changed for referring to the determination frequency table shown in FIG. 5 in accordance with a magnitude of a difference therebetween, storing the storage and learning unit 3 with the thus measured frequency.

In first step S001 in the flowchart of FIG. 3, there is a standby process for a fixed time such as 10 minutes. Note that a reading process, etc. is executed during the standby period, and hence the frequency in use (which is the number of pieces of demodulated bar code) is counted. In step S002, executed after the fixed time has elapsed, it is checked whether the frequency in use has changed or not. In other words, the frequency in use during the standby process in step S001 is calculated, and a value of the thus calculated frequency in use is compared with a value of the frequency in use which has been recently stored in the storage and learning unit 3. Then, if the frequency in use has not changed, the processing is returned to step S001.

Whereas, if the frequency in use has changed, it is checked whether the frequency in use has increased in step S003. Then, if the frequency in use has decreased, the detection sensitivity of the proximity sensor 8 is reduced corresponding to a quantity of decrease in step S004. More specifically, the value of the variable y for referring to the determination frequency table shown in FIG. 5 is decremented by 1 through 4. Subsequently in next step S005, the frequency in use calculated in step S093 of this time is stored in the storage and learning unit 3, and the processing is returned to step S001.

Consequently, if the frequency in use has increased, the detection sensitivity of the proximity sensor 8 is increased corresponding to a quantity of increase in step S006. More specifically, the value of the variable y for referring to the determination frequency table shown in FIG. 5 is incremented by 1 through 4. Subsequently in next step S007, the frequency in use calculated in step S003 of this time is stored in the storage and learning unit 3, and the processing is returned to step S001.

Figure 4A:
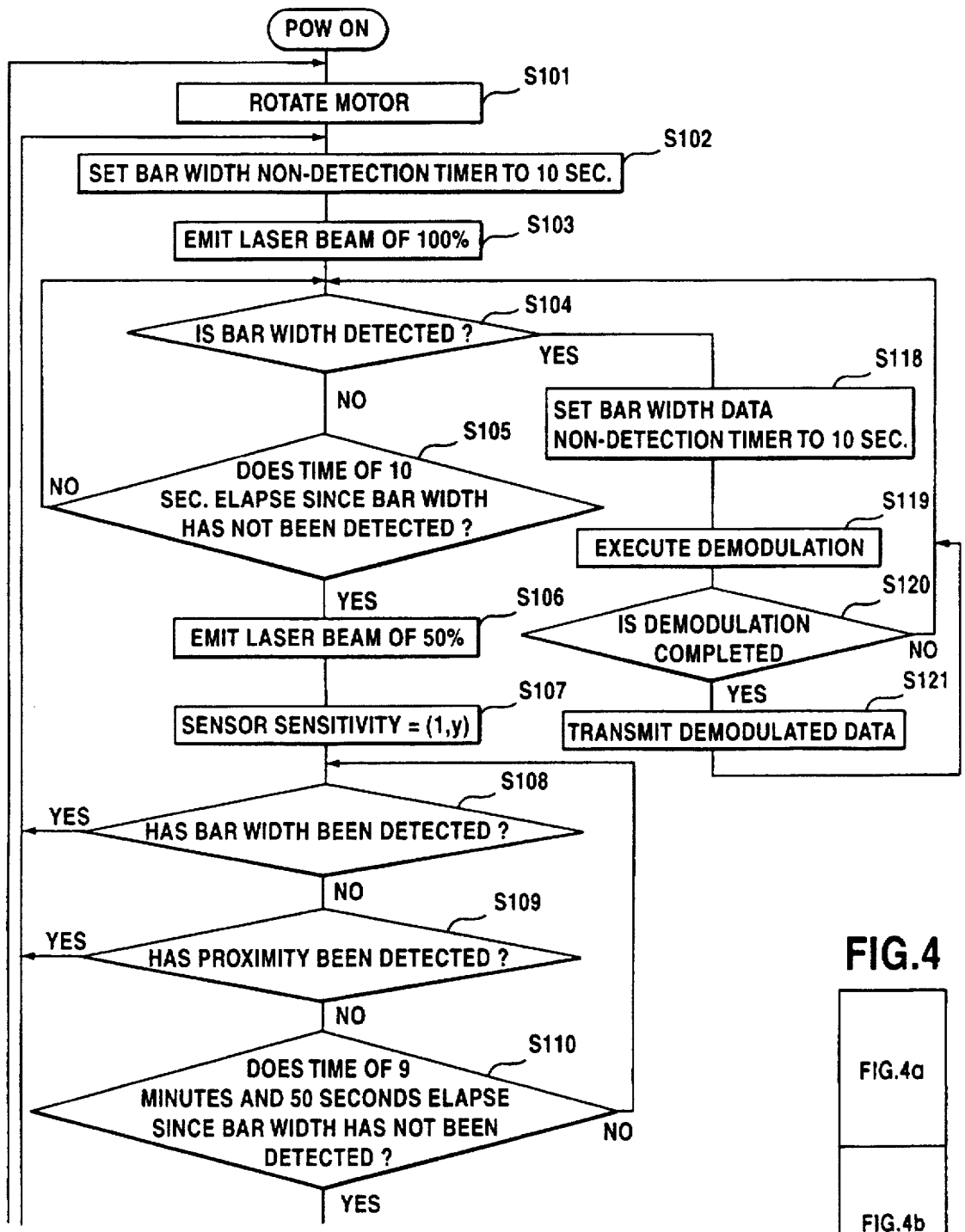
FIG. 4 is a flowchart showing a bar code demodulating process and a laser scan control process that are executed, by the CPU shown in FIG. 2.
Figure 4B:
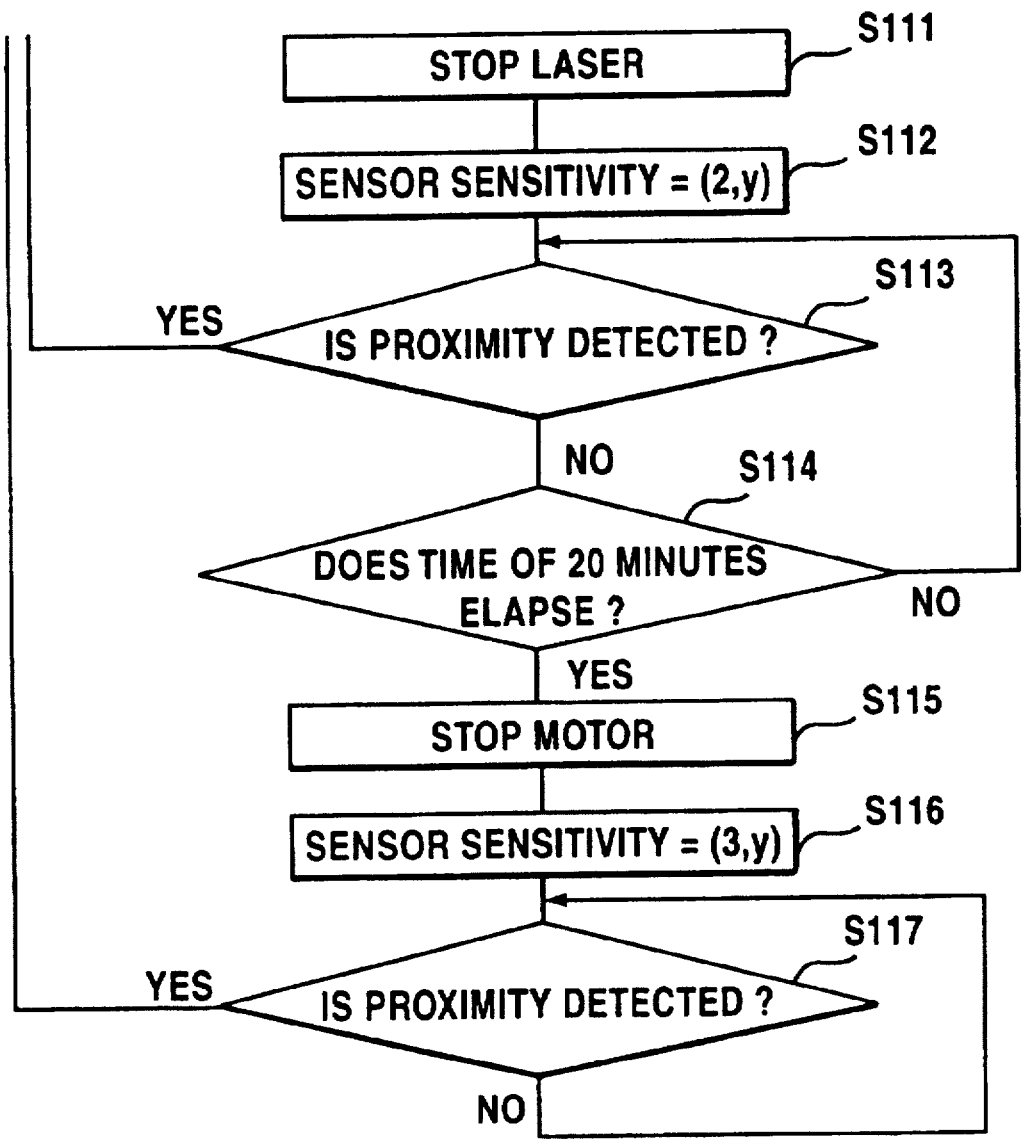

On the other hand, FIG. 4 shows the processes for irradiating or stopping the laser beams L by controlling the motor 12 and the laser light source 13, and demodulating the bar code on the basis of the bar width data outputted from the bar width counter 16.

In first step S101 in the flowchart of FIG. 4, the motor 12 is rotated, and the unillustrated polygon mirror in the scan optical system 14 is rotationally driven.

In next step S102, a timer for measuring time during which the bar width data has not detected is set at 10 sec.

In next step S103, the laser light source 13 emits the laser beams L at a duty of irradiation of 100%.

In subsequent step S104, the data outputted from the bar width counter 16 is monitored, and there is checked whether the bar width data including a pattern corresponding to the bar code 21 is detected. Then, if the bar width data is detected, the bar code 21 has been scanned with the laser beams L. Hence, in next step S118, the timer is reset at 10 and, in step S119, the demodulation based on the detected bar width data is executed (corresponding to a demodulating element). In other words, this item of bar width data is converted into corresponding data.

Checked in next step S120 is whether the demodulation in step S119 is completed. Then, if the demodulation is not completed, the processing goes back to step S104 to carry out a process for the next bar width data. Whereas if completed, in step S121, the demodulated data is transmitted via the interface circuit 9 to the host computer 22. When this transmission is finished, the processing is returned to step S104 to perform the process for the next bar width data.

Whereas if the bar width data is not detected in step S104, it is checked in step S105 whether time of 10 sec. has elapsed since the bar width data has not been detected. Then, if the time of 10 sec. has not yet elapsed, the processing goes back to step S104 to check an existence of the bar width data. contrastingly If the time of 10 sec. has already elapsed, in step S106, the auto-off control unit 6 is instructed to reduce, the duty of irradiation of the laser beams L emitted from the laser light source 13 to 50% (corresponding to an power changing element and a controlling element).

In next step S107, the detection sensitivity of the proximity sensor 8 is set to correspond to variable x=1. To be more specific, the determination threshold value table shown in FIG. 5 is referred based on the value of the variable y set in step S004 or S006 in FIG. 3 and on the variable x=1. Then, a corresponding determination threshold value is read and set in the proximity sensor control unit 7.

In next step S108, in the same way as step S104, the data outputted from the bar width counter 16 is monitored, and there is checked whether the bar width data including the pattern corresponding to the bar code 21 is detected. Then, if the bar width data is detected, the bar code 21 has been scanned with the laser beams L. Hence, the processing is returned to step S102 in order to set, the duty of irradiation of the laser beams L outputted from the laser light source 13 again to 100%. Note that a bar width data is again detected (S104) after the duty of irradiation of the laser beams L has been set back to 100%, and hence the bar width data detected in step S108 of this time is discarded of without being demodulated (S119)

If the bar width data is not detected, in step S109, whether the proximity sensor 8 detects a proximity of an object is checked based on the notice given from the proximity sensor control unit 7. The proximity of the object is detected by use of a detection sensitivity (which is the determination threshold value) set in step S107. Then, if the proximity of the object is detected, there is such a possibility that this object may be the goods 20 having the bar code 21, and therefore the processing is returned to step S102 to set, the duty of irradiation of the laser beams L emitted from the laser light source 13 again to 100% (corresponding toga restoring element and a restoring element).

If the proximity of the object is not detected, it is checked in step S110 whether time elapsed with no detection of any object since the check in step S109 has started reaches 9 minutes and 50 seconds. Then, if time of 9 minutes and 50 seconds has not yet elapsed, the processing returns to step S108 to continue the check as to whether the bar width data is detected or not.

Constrastingly, if the time elapsed with no detection of any object reaches 9 minutes and 50 seconds, in step Sill, the auto-off control unit 6 is instructed to completely stop the emission of the laser beams L from the laser light source 13 (corresponding to the controlling element).

Subsequently in step S112, the detection sensitivity of the proximity sensor 8 is set to a sensitivity corresponding to the variable x=2. More specifically, the determination threshold value table shown in FIG. 5 is referred based on the value of the variable y set in step S004 or S006 in FIG. 3 and on the variable x=2. Then, a corresponding determination threshold value is read and set in the proximity sensor control unit 7.

In next step S113, whether the proximity sensor 8 detects the proximity of the object is checked based on the notice given from the proximity sensor control unit 7. The proximity of the object is detected by use of the detection sensitivity (which is the determination threshold value) set in step S112. Then, if the proximity of the object is detected, there is such a possibility that this object may be the goods 20 having the bar code 21, and therefore the processing is returned to step S102 to set the duty of irradiation of the laser beams L outputted from the laser light source 13 again to 100%.

If the proximity of the object is not detected, there is checked in step S114 whether the time elapsed with no detection of any object since the check in step S113 has started reaches 20 minutes. Then, if a time of 20 minutes has not yet elapsed, the processing returns to step S113 to continue the check as to whether the bar width data is detected or not.

Contrastingly, if the time elapsed with no detection of any object reaches 20 minutes, in step S115, the auto-off control unit 6 is instructed to stop the motor 27 (corresponding to the controlling element).

Subsequently in step S116, the detection sensitivity of the proximity sensor 8 is set to a sensitivity corresponding to the variable x=3. More specifically, the determination threshold value table shown in FIG. 5 is referred based on the value of the variable y set in step S004 or S006 in FIG. 3 and on the variable x=3. Then, a corresponding determination threshold value is read and set in the proximity sensor control unit 7.

In step S117, whether or not the proximity sensor 8 detects the proximity of the object is checked based on the notice given from the proximity sensor control unit 7. The proximity of the object is detected by use of the detection sensitivity (which is the determination threshold value) set in step S116. Then, if the proximity of the object is detected, there is a possibility that this object may be the goods 20 having the bar code 21, and therefore the processing is returned to step S101 to resume the rotations of the motor 12 and to set the duty of irradiation of the laser beams L emitted from the laser light source 13 again to 100% (corresponding to the restoring element and the restoring element). If the proximity of the object is not detected, this checking process continues to be done without performing other processes until the proximity of the object is detected.

Figure 7:
FIG. 7 is an explanatory diagram showing action in the first embodiment of the present invention.

Next, the operation of the bar code reading apparatus in accordance with the first embodiment will be explained with reference to FIG. 7. Now, it is assumed that no bar width data is detected at all since a last piece of bar width data has been demodulated at a point of a time 0. Then, as indicated by a graph in the upper part of FIG. 7, the duty of irradiation of the laser beams L emitted from the laser light source 13 drops down to 50% after 10 seconds, the emission of the laser beams L is completely stopped after 10 minutes, and the motor 12 also stops after 30 minutes.

Then, during such a period (dm1) for which the duty of irradiation of the laser beams L is 100%, the bar code is always readable, and hence the proximity sensor 8 does not detect the proximity of the object.

Further, during such a period (dm2) for which the duty of irradiation of the laser beams L is 50%, the bar width counter 16 is capable of generating the bar width data. When the bar width data is obtained, the duty of irradiation of the laser beams L is set back to 100% in order to resume the reading of the bar code (S108).

Moreover, during the period (dm2) for which the duty of irradiation of the laser beams L is 50%, the proximity sensor 8 is capable of detecting the proximity of the object (S109). Then, the determination threshold value on this occasion is the lowest one that is set for the same frequency in use, while the sensitivity of the proximity sensor 8 is highest. The first reason therefor is that the possibility of the bar code being subsequently read is high because of only a comparatively short period of time having passed since the last bar width data had been detected, and therefore, a possibility of misdetecting an object other than the goods 20 remains relatively low even if the determination threshold value is decreased. The second reason therefor is that the duty of irradiation of the laser beams L merely fluctuates, with the result that a trouble caused by the misdetection is comparatively small even if an object other than the goods 20 having the bar code 21 is misdetected. Additionally, the lower the frequency in use because the higher the determination threshold value becomes, and the lower the sensitivity of the proximity sensor 8 becomes. This is derived from the fact that the possibility of the bar code being read becomes smaller as the frequency in use gets lower even if the time elapsed since the last bar width data has been detected is the same.

During a period (which is called a laser time-out) for which the motor 12 still rotates although the emission of the laser beams L is completely stopped, what is possible is only the detection of the object proximity by the proximity sensor 8 (S113). The determination threshold value on this occasion is higher than a value set for the duty of irradiation 50% at the same time frequency in use. Accordingly, the sensitivity of the proximity sensor 8 is lower than the sensitivity at the duty of irradiation 50%. The first reason therefore is that the possibility of the bar code being subsequently read is low because of a considerable period of time having passed since the last bar width data had been detected, and therefore, the possibility of misdetecting the object other than the goods 20 having the bar code 21 relatively high if when the determination threshold value is left as it is. The second reason therefore is that there is no alternative but to interrupt other processes until the laser light source 13 is excited and the emission of the laser beams L is stabilized if the object other than the goods 20 having the bar code 21 is misdetected and therefore the trouble caused by the misdetection is comparatively large. The lower the frequency in use the higher the determination threshold value becomes, and the lower the sensitivity of the proximity sensor 8 goes. This is derived from the fact that the possibility of the bar code being read becomes smaller as the frequency in use gets lower even if the time elapsed since the last bar width data has been detected is the same.

During a period for which both the emission of the laser beams L and the rotations of the motor 12 are completely stopped, referred to as a motor time-out, only the detection of the proximity of the object by the proximity sensor 8 (S117) is possible. Then, the determination threshold value at this time is, as shown in FIG. 5, the highest one that is set for the same frequency in use. Accordingly, the sensitivity of the proximity sensor 8 is lowest. This is because the process must be executed from re-driving of the motor 12 when detecting the proximity of the object due to the halt of the motor 12 in step S115 at this point of time, and because the trouble caused by the misdetection is large on account of an impossibility of performing other processes until the state of the rotations of the motor and the state of the laser beams L are stabilized. In this case, the determination threshold value is always high while the sensitivity of the proximity sensor 8 remains low at all times irrespective of the frequency in use. The reason for this is that a time of 30 or more minutes has elapsed since no bar code had been detected, and consequently there is no necessity for considering the frequency in use any more.

Thus, in accordance with the first embodiment, it is feasible to detect the proximity of the object with an optimum sensitivity and to resume the emission of the laser beams L and also the rotations of the motor 12 on the basis of the trouble caused by the misdetection depending on the state of the emission of the laser beams L and the state of the rotations of the motor 12, and on the basis of the possibility of reading the bar code expected in view of the time elapsed since the last bar width data has been detected.

Figures 8, 9:
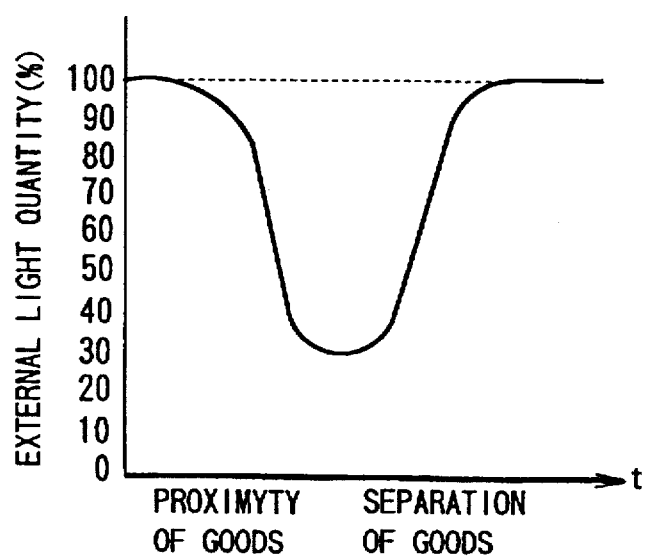
FIG. 8 is a determination threshold value table stored in the ROM shown in-FIG. 1 in a second embodiment of the present invention.
FIG. 9 is an explanatory diagram showing variations in external light quantity.

A second embodiment of the present invention is, as compared with the first embodiment discussed above, characterized by using an external light sensor for detecting a brightness of external light by way of the proximity sensor 8. The proximity sensor 8 in this case is constructed of only a photo diode exhibiting a flat frequency characteristic in a visible area. Then, the proximity sensor control unit 7 connected to this proximity sensor 8 detects, as illustrated in FIG. 9, a proximity of the object on the basis of what percentage a quantity of received light (an external light quantity) is reduced on the assumption that the quantity of received light (the external light quantity) in a normal time is set to 100%.

Figure 10:
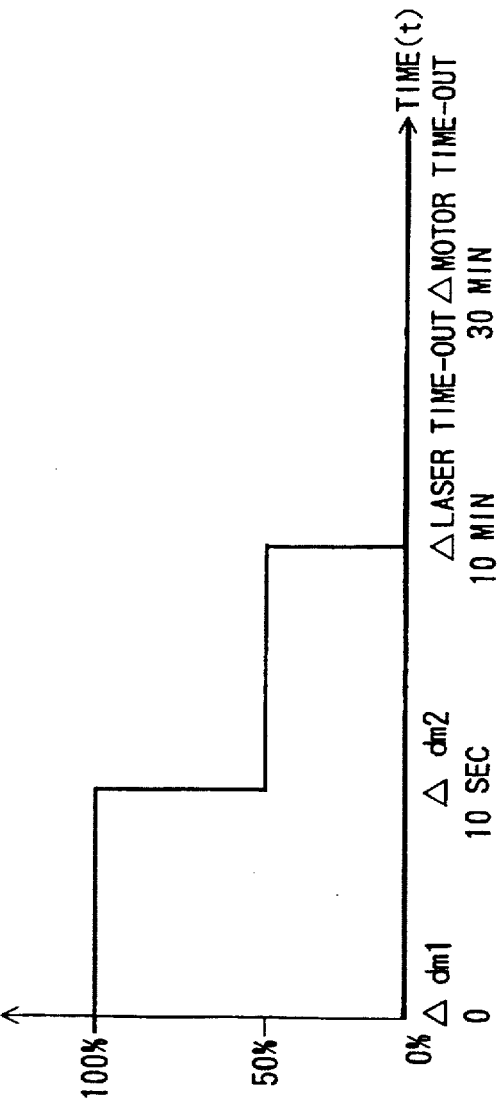
FIG. 10 is an explanatory diagram showing action in, the second embodiment of the present invention.

Accordingly, in this case, determination threshold values written in a determination threshold table stored in the ROM 5 show rates of an attenuation of light quantity to the light quantity of 100%. A detection sensitivity based thereon; however, decreases with a passage of time since the bar width data is detected last time and with a drop in frequency in use as in same way with the case of the reflection type sensor in accordance with the first embodiment. During a motor time-out period, the detection sensitivity has always the minimum value regardless of a magnitude of the frequency in use, as shown in FIG. 10.

Other configurations and functions in the second embodiment are absolutely the same as those in the first embodiment, and explanations thereof are omitted.

A third embodiment involves a hardware architecture using an external light brightness detecting type of proximity sensor 8 that is absolutely identical with the proximity sensor 8 used in the second embodiment discussed above. A process executed by the CPU 1 in the third embodiment is to simply set the duty of irradiation of the laser beams L to 50% without halting both the emission of the laser beams L and the rotations of the motor 12 even if there would be no detection of the object by the proximity sensor 8 for a long period of time. Further, unlike such a process in the second embodiment that the sensitivity of the proximity sensor 8 is decreased with the drop in the frequency in use, a process in accordance with the third embodiment is that the sensitivity of the proximity sensor 8 is decreased only when a fixed time elapses while no detection of the bar code is made.

Figure 11:
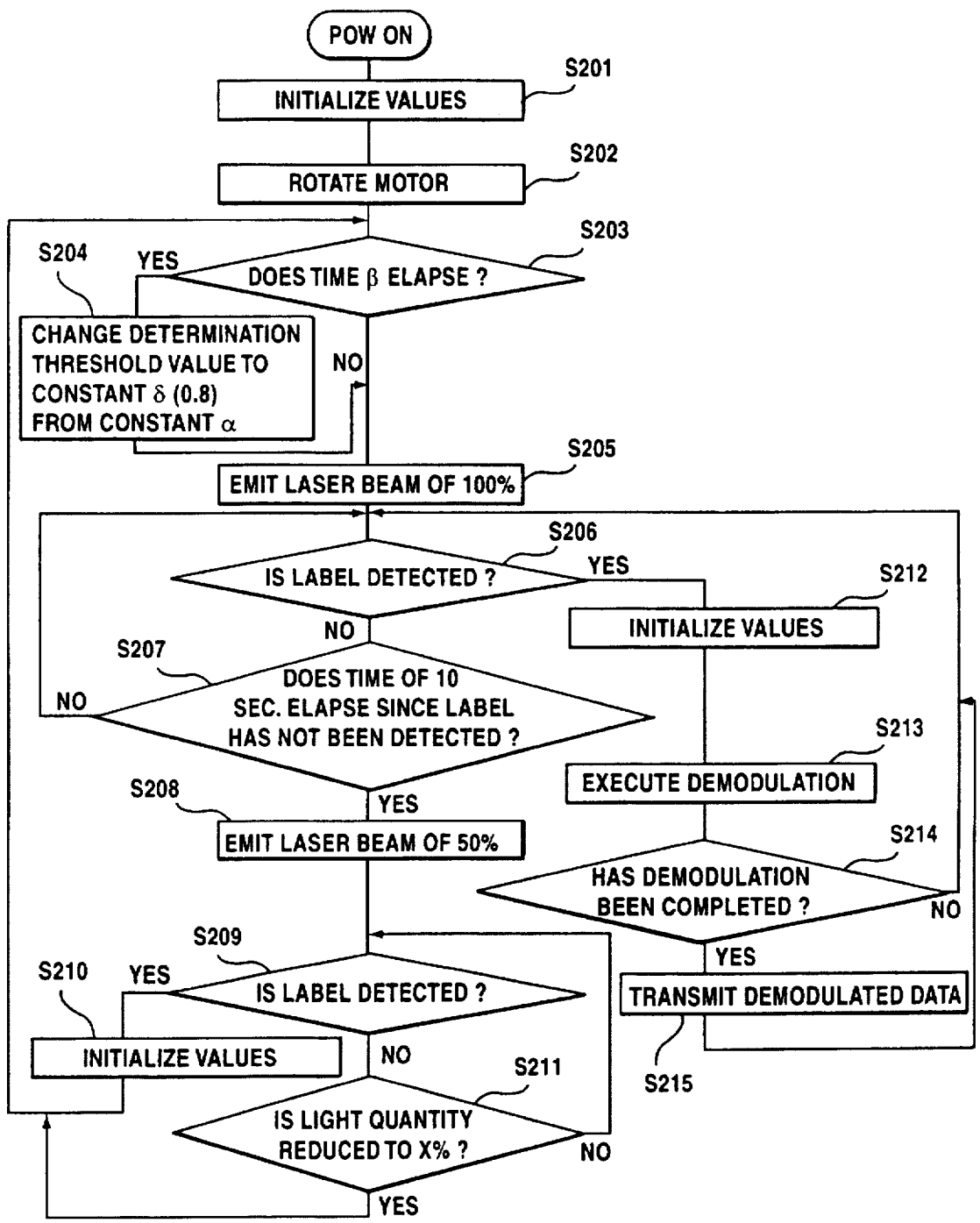
FIG. 11 is a flowchart showing a bar code demodulating process and a laser scan control process in a third embodiment of the present invention.

FIG. 11 shows the processes executed by the CPU 1 in accordance with the third embodiment. These processes start with a power supply to the bar code reading apparatus. In first step S201, each of numeral values used for those processes is initialized. More specifically, the "determination threshold value" used when a proximity of an object detected based on a reduction in the external light quantity measured by the proximity sensor 8 is set a constant α (0.9). If this "determination threshold value" is set to the constant α (0.9), the detection sensitivity of the external light sensor 8 comes to 90%. Further, the "time β" corresponding to a time until the "determination threshold value" is changed is set to 10 minutes. Set further to 100 ms is the "interval γ" corresponding to a time interval for sampling quantity of the light detected by the proximity sensor 8 for measuring an average value of the external light quantities. Then, the external light sampling at the interval γ (100 ms) is started, and a monitoring timer for monitoring an elapsed time is also started. This time monitoring timer may be a software timer.

In next step S202, the motor 12 starts rotating, and an unillustrated polygon mirror in the scan optical system 14 is rotationally driven.

In next step S203, whether an elapsed time monitored by the monitoring timer reaches the time β (10 minutes) is checked. Then, if the time β (10 minutes) is not yet reached, the processing proceeds directly to step S205. Whereas if the time β (10 minutes) has already been reached, in step S204, the "determination threshold value " is changed from the constant α (0.9) to a constant δ (0.8), and the detection sensitivity of the external light sensor 8 is set to 80% (which corresponds to a sensitivity decreasing element). Thereafter, the processing proceeds to step S205.

In step S205, the laser light source 13 emits the laser beams L at a duty of irradiation of 100%.

In next step S206, the data outputted from the bar width counter 16 is monitored, and it is checked whether or not the bar width data including the pattern corresponding to the bar code 21 is detected. Then, if the bar width data is detected, it is Judged that the bar code 21 is scanned with the laser beams L, and hence the processing proceeds to step S212. In step S212, in absolutely the same manner as step S201, a variety of numerical values used in this processing are initialized. In next step S213, the demodulation based on the detected bar width data is carried out (corresponding to a demodulating element). In other words, the bar width data is converted into corresponding data. Checked in next step S214 is whether the demodulation in step S213 has completed or not. Then, if the demodulation has not completed, the processing is returned to step S206 to execute a process for the next bar width data. Contrastingly if the demodulation is completed, in step S215, the demodulated data is transmitted via the interface circuit 9 to the host computer 22. When this transmission has done, the processing is returned to step S206 to execute a process for the next bar width data.

Whereas if no bar width data is detected in step S206, it is checked in step S207 whether the time of 10 sec. has elapsed since the bar width data has detected last time. Then, if the time of 10 sec. has not yet elapsed, the processing goes back to step S206 to check an existence of the bar width data. Contrastingly if the time of 10 sec. has already elapsed, in step S208, the auto-off control unit 6 is instructed to reduce the duty of irradiation of the laser beams L emitted from the laser light source 13 to 50% (corresponding to the power changing element and the controlling element).

In step S209, as in step S206, the data outputted from the bar width counter 16 is monitored, and there is checked whether the bar width data including the pattern corresponding to the bar code 21 is detected. Then, if the bar width data is detected, it is judged that the bar code 21 is scanned-with the laser beams L. Hence, the processing is returned to step S203 in order to restore the duty of irradiation of the laser beams L outputted from the laser light source 13 to 100%. Note that the numerical values, which are determination threshold values, are initialized in step S210 when the processing returns to step S203, and therefore the detection sensitivity of the proximity sensor 8 hereafter becomes 90%.

If no bar width data is detected, in step S211, whether an object approaches the front of the proximity sensor 8 is checked based on the notice given from the proximity sensor control unit 7. More specifically, nine pieces of latest values among the external light quantity values obtained by sampling at every interval of γ (100 ms) are averaged, thereby an "average value ε" is obtained. Next, the external light quantity at the present time is sampled at a sampling interval of 10 ms, and the sampled light quantity is set to the "sampled value ζ". After the above processing, there is checked whether the above-described "determination threshold value", the "average value ε" and the "sampled value ζ" satisfy the following formula (1).

Average Value ε×Determination Threshold Values ≧ Value    (1)

If this formula is satisfied, it is judged that the present light quantity (which is the sampled value) is not more than X% (which is 90% when the determination threshold value is set to the constant α or 80% when it is set to the constant δ) of the light quantity previous to the point of time (which is the average value ε). Accordingly, it is judged that an object approaches the front of the external light sensor 8. Then, if it is judged that an object approaches (if the external light quantity is X% or under), the processing is returned to S203 in order to restore the duty of irradiation of the laser beams L emitted from the laser light source 13 to 100%. This case does not imply that the bar width data itself is detected, and therefore, no numerical value (threshold value) is initialized. Accordingly, the detection sensitivity of the proximity sensor 8 remains as it is. Contrastingly, if it is judged that no object approaches the front (if the external light quantity exceeds X%), the processing returns to step S209.

Next, the operation of the bar code reading apparatus in the third embodiment will be explained. Now, it is assumed that no bar width data is absolutely detected after the bar width data has been demodulated last time. In this case, the duty of irradiation of the laser beams L emitted from the laser light source 13 is reduced down to 50% when elapsed time reaches 10 sec. since the bar width data has been demodulated last time.

During such a period for which the duty of irradiation of the laser beams L is 50%, the bar width counter 16 is capable of generating the bar width data. When the bar width data is obtained, the duty of irradiation of the laser beams L is set back to 100% in order to resume the reading of the bar code (S209, S205).

Further, during the period for which the duty of irradiation of the laser beams L is 50%, the proximity sensor 8 is also capable of detecting a proximity of an object (S211). In the initial status, the determination threshold value for the proximity sensor 8 to detect the proximity of an object is 90% of the average value (the average value ε) of the normal external light quantity.

If the bar width data is detected after the proximity sensory 8 has detected the proximity an the object, in step S212, the "determination threshold value" is initialized. If the bar width data is not detected after the proximity sensory 8 has detected the proximity of an object, however, this can be recognized as a misdetection, and therefore the "determination threshold value" is not initialized. Then, when the elapsed time reaches 10 minutes (a time β) while no initialization of the "determination threshold value" is made, in step S204, the "determination threshold value" comes to 80% of the average value (average value ε) of the normal external light quantity. In other words, the detection sensitivity of the proximity sensor 8 decreases. This is due to the fact that the possibility of reading the bar code 21 becomes lower as the elapsed time becomes longer since the bar width data was detected last time, and the fact that there relatively increases a possibility of misdetecting an object other than the goods 20 including the bar code 21 if the determination threshold value remains as it is. Incidentally, as discussed above, the "determination threshold value" is, even after reduced to 80%, immediately initialized in step S212 and set back to 90% on the condition that the bar width data is detected.

Note that in the above-described determination about the proximity of the object in step S209, the "sampled value ζ" substituted into the formula (1) may be replaced with an average value of the latest three values among the external light quantity values sampled at the interval of 10 ms.

A characteristic of a fourth embodiment of the present invention is, as compared with the third embodiment discussed above, that the number of misdetections of the proximity f the object by the proximity sensor 8 (S303 is used as the trigger for decreasing the "determination threshold value"). Other configurations in the fourth embodiment are absolutely the same as those in the third embodiment.

Figure 12:
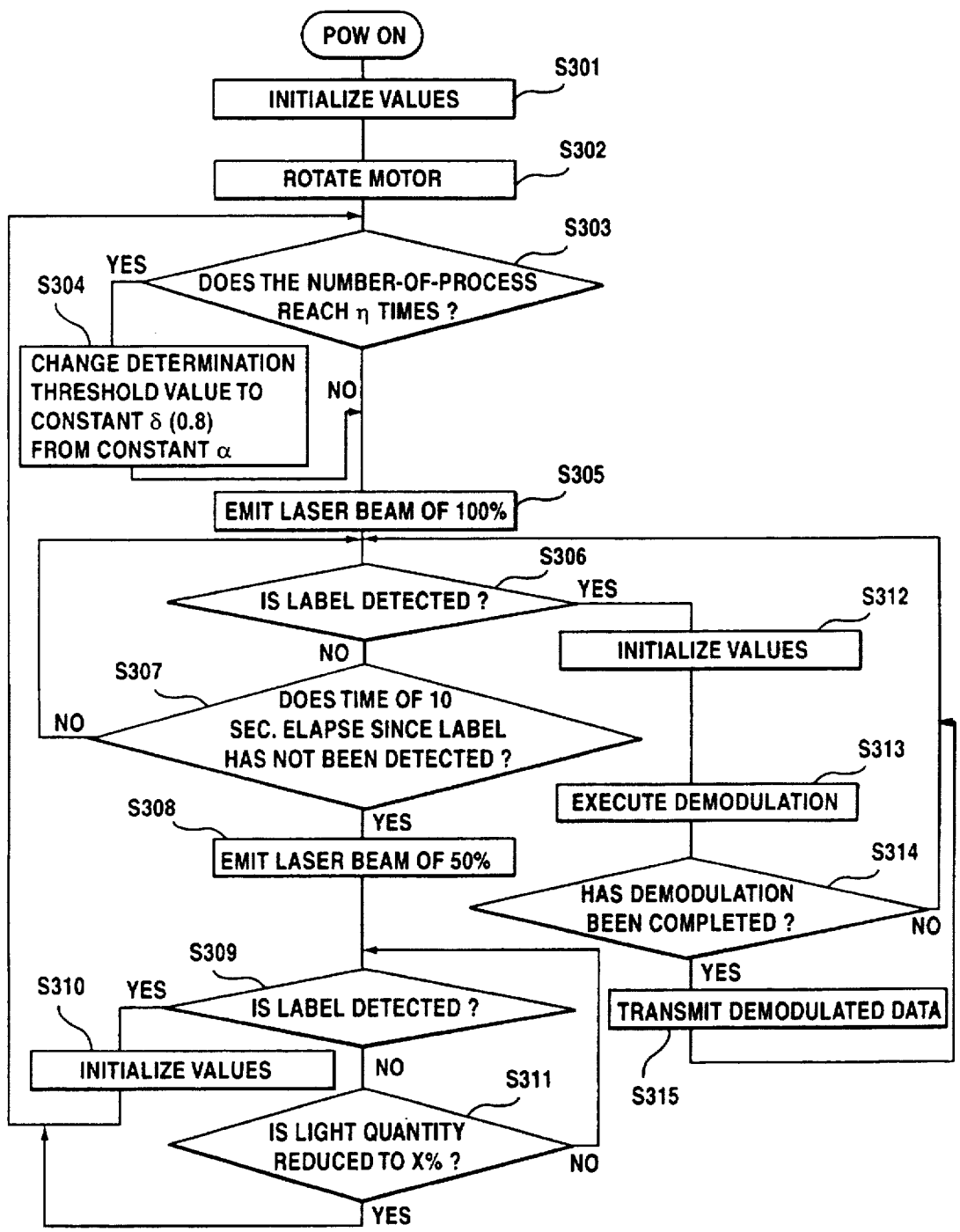
FIG. 12 is a flowchart showing a bar code demodulating process and the laser scan control process in a fourth embodiment of the present invention.

FIG. 12 shows the processes executed by the CPU 1 in the fourth embodiment. These processes start with the power supply to the bar code reading apparatus. In first step S301, each of the numeral values used for those processes is initialized. More specifically, the "determination threshold value" used when a proximity of an object detected based on the reduction in the external light quantity measured by the proximity sensor 8 is set to a constant value α (0.9). If this "determination threshold value" is set to the constant α (0.9), the detection sensitivity of the external light sensor 8 comes to 90%. Further, the "number-of-times η" corresponding to the number of misdetections of the proximity of the object until the "determination threshold value" is changed is set to 30 times. Set further to 100 ms is an "interval γ" corresponding to the time interval for sampling quantity of the light detected by the proximity sensor 8 for measuring the average value of the external light quantities. Then, the external light sampling at the interval δ (100 ms) is started.

In next step S302, the motor 12 starts rotating, and the polygon mirror in the scan optical system 14 is rotationally driven.

In step S303, whether the number of misdetections of a proximity of an object by the proximity sensor 8 reaches the number-of-times η (30 times) is checked. Then, if it does not reach the number-of-times η (30 times), the processing proceeds directly to step S305. Whereas if the number-of-times η (30 times) has already been reached, in step S304, the "determination threshold value" is changed from the constant α (0.9) to the constant δ (0.8), and the detection sensitivity of the external light sensor 8 is set to 80% (corresponding to the sensitivity decreasing element). Thereafter, the processing proceeds to step S305.

In step S305, the laser light source 13 emits the laser beams L at the duty of irradiation of 100%.

In step S306, the data outputted from the bar width counter 16 is monitored, and it is checked whether or not the bar width data including the pattern corresponding to the bar code 21 is detected, is checked. Then, if the bar width data is detected, it is judged that the bar code 21 is scanned with the laser beams L, and hence the processing proceeds to step S312. In step S312, in the same manner as step S301, a variety of numerical values used in this processing are initialized. In step S313, the demodulation based on the detected bar width data is carried out (corresponding to the demodulating element). In other words, the item of bar width data is converted into corresponding data. Checked in next step S314 is whether the demodulation in step S313 has completed or not. Then, if the demodulation has not completed, the processing is returned to step S306 to execute a process for the next bar width data. Contrastingly, if the demodulation has completed, in step S315, the demodulated data is transmitted via the interface circuit 9 to the host computer 22. When this transmission is done, the processing is returned to step S306 to execute a process for the next bar width data.

Whereas if no bar width data is detected in step S306, it is checked in step S207 whether the time of 10 sec. has elapsed since the bar width data hast detected last time. Then, if the time of 10 sec. Has not yet elapsed, the processing goes back to step S306 to check an existence of the bar width data. Contrastingly, if the time of 10 sec. has already elapsed, in step S308, the auto-off control unit 6 is instructed to reduce the duty of irradiation of the laser beams L emitted from the laser light source 13 to 50% (corresponding to the power changing element and the controlling element).

In step S309, in the same way as step S306, the data outputted from the bar width counter 16 is monitored, and there is checked whether the bar width data including the pattern corresponding to the bar code 21 is detected. Then, if the bar width data is detected, it is judged that the bar code 21 is scanned with the laser beams L. Hence, the processing is returned to step S303 in order to restore the duty of irradiation of the laser beams L outputted from the laser light source 13 to 100% (corresponding to the restoring element and the restoring element). When the processing returned to step S303, however, the numerical values (which are the determination threshold values) are initialized in step S310, and hence the detection sensitivity of the proximity sensor 8 hereafter becomes 90%.

Whereas if no bar width data is detected, in step S311, whether an object approaches the front of the proximity sensor 8 is checked based on the notice given from the proximity sensor control unit 7. More specifically, nine pieces of latest values among the external light quantity values obtained by sampling at every interval of γ (100 ms) are averaged, thereby an "average value ε" is obtained. Next, the external light quantity at the present time is sampled at the sampling interval of 10 ms, and the sampled light quantity is set to the "sampled value ζ". After the above processing, there is checked whether the above-described "determination threshold value", the "average value ε" and the "sampled value ζ" satisfy the formula (1) given above. If the above formula is satisfied, it is judged that the present light quantity (which is the sampled value) is not more than X% (which is 90% when the determination threshold value is set to the constant value α and 80% when it is set to the constant δ) of the light quantity previous to the point of time (which is the average value ε). Accordingly, it is judged that an object approaches the front the front of the external light sensor 8. Then; if it is judged that an object approaches the front (if the external light quantity is X% or under), the processing is returned to S303 in order to restore the duty of irradiation of the laser beams L emitted from the laser light source 13 to 100% (corresponding to the restoring element and the restoring element). This case does not, however, imply that the bar width data itself is detected, and therefore, no numerical value (threshold value) is initialized. Accordingly, the detection sensitivity of the proximity sensor 8 remains as it is. Contrastingly, if it is judged that no object approaches the front (if the external light quantity exceeds X%), the processing returns to step S309.

Next, the operation of the bar code reading apparatus in the fourth embodiment will be discussed. Now, it is assumed that no bar width data is detected after the bar width data has been demodulated last time. In this case, the duty of irradiation of the laser beams L emitted from the laser light source 13 is reduced down to 50% when elapsed time reaches 10 sec. since the bar width data has been demodulated last time.

During a period for which the duty of irradiation of the laser beams L is 50%, the bar width counter 16 is capable of generating the bar width data. When the bar width data is obtained, the duty of irradiation of the laser beams L is set back to 100% in order to resume the reading of the bar code (S309, S305).

Further, during the period for which the duty of irradiation of the laser beams L is 50%, the proximity sensor 8 is also capable of detecting a proximity of an object (S311). In the initial status, the determination threshold value for the proximity sensor 8 to detect the proximity of an object is 90% of the average value (the average value ε) of the normal external light quantity.

If the bar width data is detected after the proximity sensor 8 has detected the proximity of an object, in step S312, the "determination threshold value" is initialized. If the bar width data is not detected after the proximity sensor 8 has detected the proximity of an object, however, this can be recognized as a misdetection, and therefore the "determination threshold value" is not initialized. Then, when the number of misdetections reaches the number-of-times η (30 times), in step S304, the "determination threshold value" becomes 80% of the average value (the average value ε) of the normal external light quantity. In other words, the detection sensitivity of the proximity sensor 8 decreases. This is due to the fact that an undetectable time of the bar width data elongates and therefore the possibility of reading the bar code 21 becomes lower as the number of misdetections increases, and the fact that there relatively increases the possibility of misdetecting an object other than the goods 20 including the bar code 21 if the determination threshold value remains as it is. Incidentally, as discussed above, the "determination threshold value" is, even after reduced to 80%, immediately initialized in step S312 and set back to 90% on the condition that the bar width data is detected.

Note that in the above-described determination about the proximity of the object in step S309, the "sampled value ζ" substituted into the formula (1) may be replaced with an average value of the latest three values among the external light quantity values sampled at the interval of 10 ms.

A fifth embodiment of the present invention involves, in absolutely the same manner as the second embodiment discussed above, the use of the hardware architecture using the external light brightness detection type of proximity sensor 8. In the processes executed by the CPU 1 in the fifth embodiment, however, there are performed neither the detection of the frequency in use (FIG. 3) nor the change in the sensitivity of the proximity sensor 8 in accordance with the variations in the frequency in use. Instead, in accordance with the fifth embodiment, when the proximity sensor 8 detects the object without detecting the bar width data, there is reduced a length of the period for which the duty of irradiation of the laser beams L is 50%, i.e., a time until the emission of the laser beams L is stopped. Note that a "status A" indicates a status where the duty of irradiation of the laser beams L is 100%, a "status B" indicates a status where the duty of irradiation of the laser beams L is 50%, a "status C" indicates a status where the emission of the laser beams L is stopped with the motor 12 rotated and a "status D" indicates a status where the motor 12 stops, in the fifth embodiment. Other configurations in the fifth embodiment are absolutely the same as those in the second embodiment.

Figure 13B:
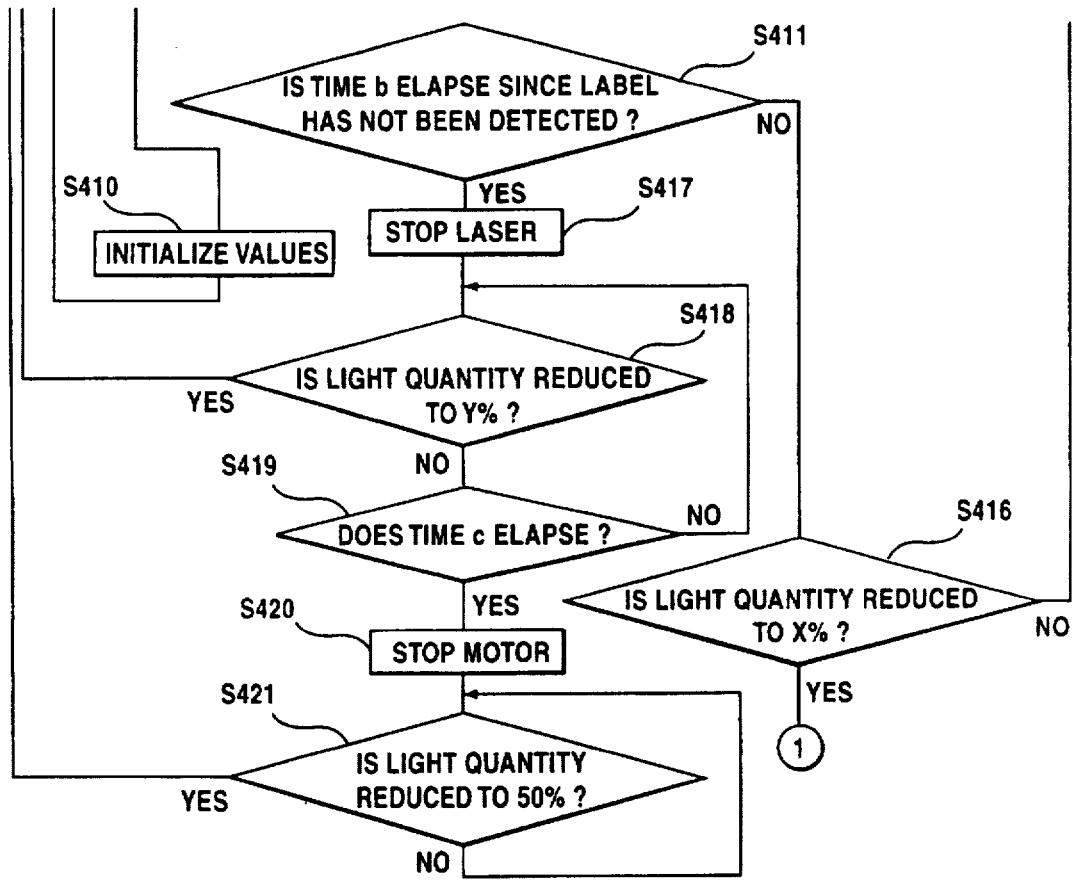
FIG. 13 is a flowchart showing a bar code demodulating process and the laser scan control process in a fifth embodiment.

FIG. 13 shows the processes executed by the CPU 1 in the fifth embodiment. These processes start with the power supply to the bar code reading apparatus. In first step S401, each of numeral values used for those processes is initialized. More specifically, the "time a" corresponding to a transition time from the status A to the status B is set to 10 sec. The "time b" corresponding to a transition time from the status B to the status C is set to 9 minutes and 50 seconds. The "time c" corresponding to a transmission time from the status C to the status D is set to 20 minutes. The "determination threshold value" used when a proximity of an object is detected based on the reduction in the external light quantity measured by the proximity sensor 8 is set further to a constant α (0.9). The "interval γ" corresponding to a time interval for sampling the quantity of the light detected by the proximity sensor 8 for measuring an average value of the external light quantities is set to 100 ms. Then, the external light sampling at the interval γ (100 ms) is started, and the monitoring timer for monitoring an elapsed time is also started. This monitoring timer may be a software timer.

In next step S402, the motor 12 starts rotating, and the polygon mirror in the scan optical system 14 is rotationally driven.

In next step S403, whether the external light sensor 8 detects a proximity of an object is checked. Then, if the proximity of an object is detected, in step S404, one of the status transition times is changed. To be specific, the time set to the "time b" is changed to 10 sec. (corresponding to a time setting element). Thereafter, the processing proceeds to step S405. Whereas if the proximity of an object remains undetected, the processing proceeds directly to step S405.

In step S405, the laser light source 13 emits the laser beams L at the duty of irradiation of 100%.

In next step S406, the data outputted from the bar width counter 16 is monitored, and it is checked whether or not the bar width data including the pattern corresponding to the bar code 21 is detected. Then, if the bar width data is detected, it is judged that the bar code 21 is scanned with the laser beams L, and hence the processing proceeds to step S412. In step S412, in the same manner as step S401, a variety of numerical values used in this processing are initialized. In next step S413, the demodulation based on the detected bar width data is carried out (corresponding to the demodulating element). In other words, the bar width data is converted into corresponding data. Checked in step S414 is whether the demodulation in step S413 has completed or not. If the demodulation has not completed, the processing is then returned to step S406 to execute a process for the next bar width data. Contrastingly, if the demodulation has completed, in step S415, the demodulated data is transmitted via the interface circuit 9 to the host computer 22. When this transmission has done, the processing is returned to step S406 to execute a process for the next bar width data.

If no bar width data is detected in step S406, it is checked in step 407 whether the time a (10 sec.) has elapsed since the bar width data has detected last time. Then, if the time a (10 sec.) has not yet elapsed, the processing goes back to step S406 to check an existence of the bar width data. Contrastingly if the time a (10 sec.) has already elapsed, in step S408, the auto-off control unit 6 is instructed to reduce the duty of irradiation of the laser beams L emitted from the laser light source 13 to 50% (corresponding to the power changing element and the controlling element).

In next step S409, in the same way as step S406, the data outputted from the bar width counter 16 is monitored, and there is checked whether the bar width data including the pattern corresponding to the bar code 21 is detected. Then, if the bar width data is detected, it is judged that the bar code 21 is scanned with the laser beams L. Hence, the processing is returned to step S403 in order to restore the duty of irradiation of the laser beams L emitted from the laser light source 13 to 100% (corresponding to the restoring element and the restoring element). However, the numerical value (time b) is initialized in step S410 when the processing returns to step S403, and therefore the "time b" hereafter becomes 9 minutes and 50 seconds.

Whereas if no bar width data is detected, it is checked in step S411 whether the time elapsed without detecting the bar width data after the completion of checking in step S407 reaches the time b (9 minutes and 50 seconds, or 10 seconds).

Then, if the time b (9 minutes and 50 seconds, or 10 seconds) is not reached, in step S416, whether an object approaches the front of the proximity sensor 8 is checked based on the notice given from the proximity sensor control unit 7. More specifically, nine pieces of latest values among the external light quantity values obtained by sampling at every interval of γ (100 ms) are averaged, thereby an "average value ε" is obtained. Next, the external light quantity at the present time is sampled at the sampling interval of 10 ms, and the sampled light quantity is set to a "sampled value ζ". After the above processing, there is checked whether the above-described "determination threshold value", the "average value ε" and the "sampled value ζ" satisfy the above-described formula (1).

If the above formula (1) is satisfied, it is judged that the present light quantity (which is the sampled value) is not more than X% (90%) of the light quantity previous to that point of time (which is an average value ε). Accordingly, it is judged that an object approaches the front of the external light sensor 8. In this case, the processing is returned to S403 in order to restore the duty of irradiation of the laser beams L emitted from the laser light source 13 to 100% (corresponding to the restoring element and the restoring element). This case does not, however, imply that the bar width data itself is detected, and therefore no numerical value (the time b) is initialized. Accordingly, the time set to the "time b" remains as it is. Whereas if it is judged that no object approaches the front (if the external light quantity exceeds X%), the processing returns to step S409 to detect the bar width data.

On the other hand, it is judged that the elapsed time has already reached the time b (9 minutes and 50 seconds, or 10 seconds) in step S411, the processing proceeds to step S417. In step S417, the emission of the laser beams L from the laser light source 13 is completely stopped (corresponding to the control element).

In step S418, whether or not an object approaches the front of the proximity sensor 8 is checked based on the notice given from the proximity sensor control unit 7. More specifically, in the same way as step S416, the "average value ε" and the "sampled value ζ" are obtained. After the obtaining, there is checked whether the above-described "determination threshold value", the "average value ε" and the "sampled value ζ" satisfy the following formula (2).

$$\text{Average Value } \epsilon \times (\text{Determination Threshold Value} - 0.1) \geq \text{Sampled value} \quad (2)$$

If this formula (2) is satisfied, it is judged that the present light quantity previous to the point of time (which is the sampled value) is not more than Y% (80%) of the light quantity (which is the average value ε). Accordingly, it is judged that an object approaches the front of the external light sensor 8. In this case, the processing is returned to S403 in order to restore the duty of irradiation of the laser beams L outputted from the laser light source 13 to 100%, does not, however, imply that the bar width data itself is detected, and therefore, no numerical value (the time b) is initialized. Accordingly, the time set to the "time b" remains as it is. If it is judged that no object approaches the front (if the external light quantity exceeds Y%), the processing proceeds to step S419.

Checked in step S419 is whether or not the time elapsed without detecting the proximity of the object after the completion of the checking in step S411 reaches the time c (20 minutes). Then, if the time c (20 minutes) is not reached, the processing returns to step S418. Contrastingly, it is judged that the elapsed time reaches the time c (20 minutes), the processing proceeds to step S420. In step S420, the motor 12 stops rotating (corresponding to the control element).

In step S421, whether an object approaches the front of the proximity sensor 8 is checked based on the notice given from the proximity sensor control unit 7. More specifically, in the same manner as step S416, the "average value $\epsilon$" and the "sampled value $\zeta$" are obtained. After the obtaining, there is checked whether the above-described "determination threshold value", the "average value $\epsilon$" and the "sampled value $\zeta$" satisfy the following formula (3).

$$\text{Average Value } \epsilon \times 0.5 \geq \text{Sampled value} \tag{3}$$

If this formula (3) is satisfied, it is judged that the present light quantity (which is the sampled value) is not more than 50% of the light quantity previous to the point of time (which is the average value $\epsilon$). Accordingly, it is judged that an object approaches the front of the external light sensor 8. In this case, the processing returns to step S401 in order to resume both of the rotations of the motor 12 and the emission of the laser beams L from the laser light source 13 (corresponding to the restoring element and the restoring element). In this case, the numerical value (the time b) is initialized, and hence the time set to the "time b" is set back to 9 minutes and 50 seconds. Whereas if it is judged that no object approaches (if the external light quantity exceeds Y%), the checking process in step S421 is repeated.

Next, the operation of the bar code reading apparatus in the fifth embodiment will be explained. Now, it is assumed that no bar width data is absolutely detected after the bar width data has been demodulated last time. Hereupon, the duty of irradiation of the laser beams L emitted from the laser light source 13 is reduced to 50% when elapsed time reaches 10 sec. since the bar width data has been demodulated last time.

During such a period for which the duty of irradiation of the laser beams L is 50% (status B), the bar width counter 16 is capable of generating the bar width data. When the bar width data is obtained, the duty of irradiation of the laser beams L is set back to 100% in order to resume the reading of the bar code (S409).

During the period for which the duty of irradiation of the laser beams L is 50% (status B), the proximity sensor 8 is also capable of detecting a proximity of an object (S416). The determination threshold value for the proximity sensor 8 to detect the proximity of the object used during that period is 90% of average value (the average value $\epsilon$) of the normal external light quantity.

When the time elapsed since the timing of becoming the status B reaches 9 minutes and 50 seconds, the emission of the laser beams L is completely stopped (step S417). During such a period for which the emission of the laser beams 1 is completely stopped (status C), what is possible is only the detection of the proximity of the object by the proximity sensor 8 (step S418). The determination threshold value for detecting the proximity of the object by the proximity sensor 8 used during that period is 80% of the average value (the average value $\epsilon$) of the normal external light quantity.

When the time elapsed since the timing of becoming the status C reaches 20 minutes, the motor 12 also stops rotating (step S420). During such a period that the motor 12 stops rotating (status D), what is possible is only the detection of the proximity of an object by the proximity sensor 8 (step S421). The determination threshold value for detecting the proximity of the object by the proximity sensor 8 used during that period is 50% of the average value (the average value $\epsilon$) of the normal external light quantity.

When the proximity sensor 8 detects the proximity of the object during a period for which it is the status-B or status-C, the time b corresponding to the period for which the duty of irradiation of the laser beams L is 50% is changed to 10 seconds (step S404). Then, if no bar width data is thereafter detected, it is possible to determine that there must be a misdetection by the proximity sensor 8. Hence, hereafter, the laser beams L are emitted at the duty of irradiation of 100% for 10 seconds and also emitted at the duty of irradiation of 50% for 10 seconds. Thereafter, the emission of the laser beams L is halted. An unnecessary emission of the laser beams L can be thereby prevented.

Contrastingly, when the bar width data is detected after the proximity sensor 8 has detected the proximity of an object, the "time b" is set back to the initial value (9 minutes and 50 seconds).

Note that in the determination about the proximity of the object in steps S416, S418 or step S421, the "sampled value $\zeta$" substituted into the formulae (1) through (3) may be replaced with an average value of the latest three values among the external light quantity values sampled at the interval of 10 ms.

A sixth embodiment of the present invention is, as compared with the fifth embodiment discussed above, characterized by changing all the status transition times (the time a, the time b and the time c) when the proximity sensor 8 detects the proximity of an object. Other configurations in the sixth embodiment are absolutely the same as those in the fifth embodiment.

Figures 14, 14A, 14B:
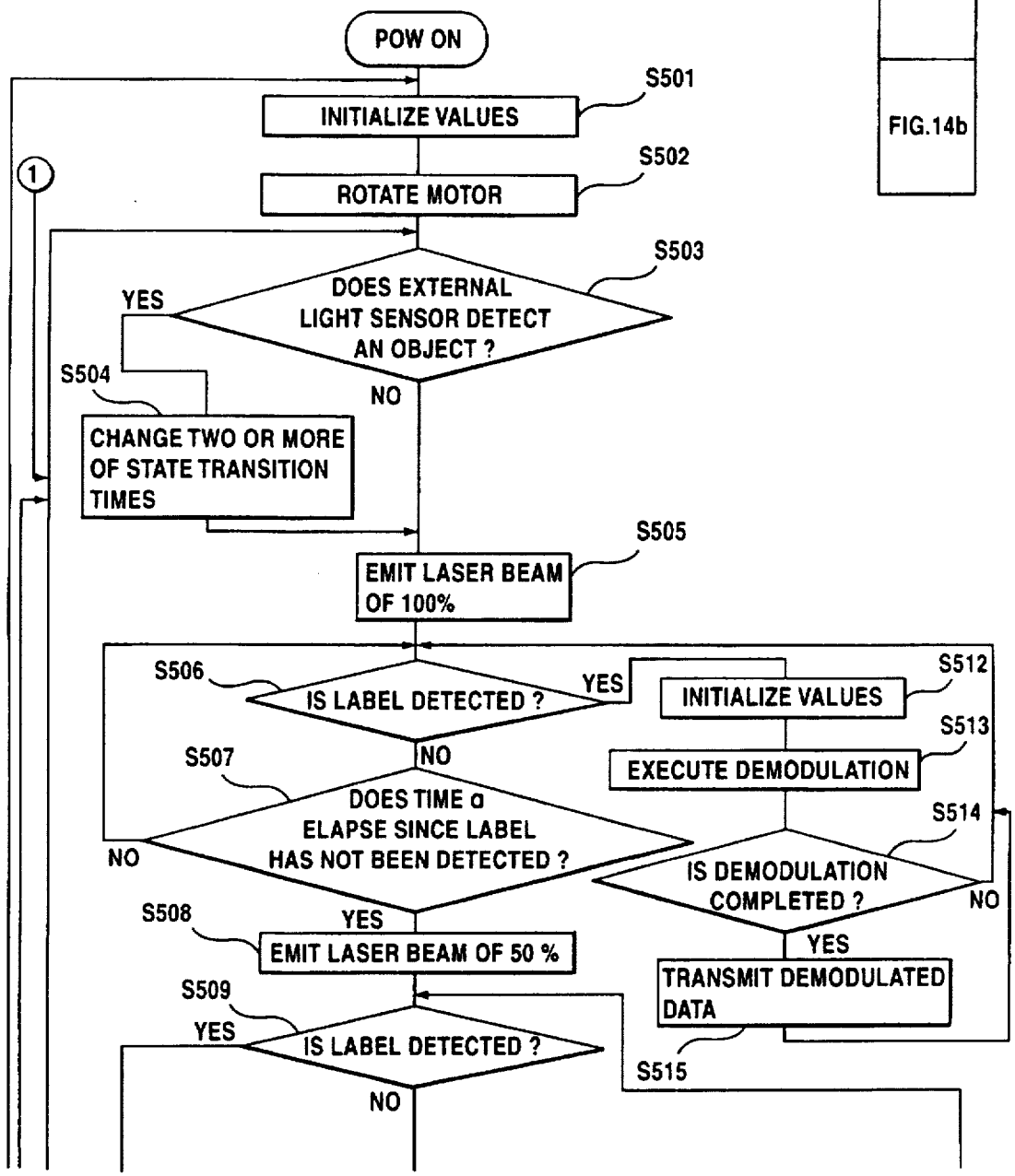
FIG. 14 is a flowchart showing a bar code demodulating process and the laser scan control process in a sixth embodiment of the present invention.
Figure 14B:
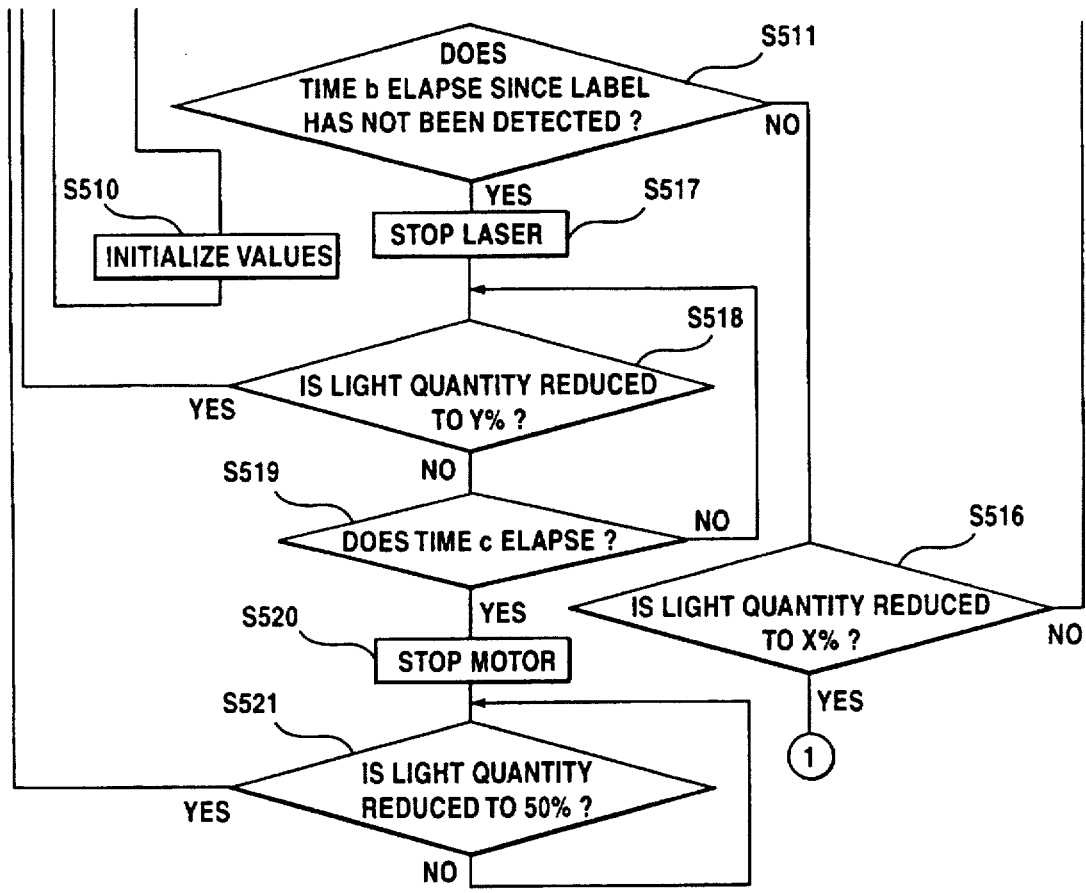

FIG. 14 shows processes executed by the CPU 1 in the sixth embodiment. These processes start with the power supply of the bar code reading apparatus. In first step S501, each of the numeral values used for those processes is initialized. More specifically, the "time a" corresponding to a transition time from the status A to the status B is set to 10 sec. The "time b" corresponding to a transition time from the status B to the status C is set to 9 minutes and 50 seconds. The "time c" corresponding to a transition time from the status C to the status D is set to 20 minutes. The "determination threshold value" used when a proximity of an object is detected based on the reduction in the external light quantity measured by the proximity sensor 8 is set to a constant $\alpha$ (0.9). The "interval $\gamma$" corresponding to a time interval for sampling the quantity of the light detected by the proximity sensor 8 for measuring an average value of the external light quantities is set to 100 ms. Then, the external light sampling at the interval $\gamma$ (100 ms) is started, and the monitoring timer for monitoring an elapsed time is also started. This monitoring timer may be a software timer.

In next step S502, the motor 12 starts rotating, and the polygon mirror in the scan optical system 14 is rotationally driven.

In next step S503, whether the external light sensor 8 detects a proximity of an object is checked. Then, if the proximity of an object is detected, in step S504, each status transition time is changed (corresponding to the time setting element). To be specific, the time set to the "time a" is changed to 5 sec. The time set to the "time b" is changed to 10 sec. The time set to the "time c" is changed to 10 sec.. Thereafter, the processing proceeds to step S505. Whereas if the proximity of an object is not yet detected, the processing proceeds directly to step S505.

In step S505, the laser light source 13 emits the laser beams L at the duty of irradiation of 100%.

In next step S506, the data outputted from the bar width counter 16 is monitored, and it is checked or not the bar width data including the pattern corresponding to the bar code 21 is detected. Then, if the bar width data is detected, it is checked that the bar code 21 is scanned with the laser beams L, and hence the processing proceeds to step S512. In step S512, in absolutely the same manner as step S501, a variety of numerical values used in this processing are initialized. In next step S513, the demodulation based on the detected bar width data is carried out (corresponding to the demodulating element). In other words, the bar width data is converted into corresponding data. Checked in next step S514 is whether the demodulation in step S513 has completed or not. Then, if the demodulation has not completed, the processing is returned to step S506 to execute a process for the next bar width data. Contrastingly if the demodulation has completed, in step S515, the demodulated data is transmitted via the interface unit 9 to the host computer 22. When this transmission has done, the processing is returned to step S506 to execute a process for the next bar width data.

Whereas if no bar width data is detected in step S506, it is checked in step S507 whether the time a (10 or 5 sec.) has elapsed since the bar width data has detected last time. Then, if the time a (10 or 5 sec.) has not yet elapsed, the processing goes back to step S506 to check an existence of the bar width data. Contrastingly if the time a (10 or 5 sec.) has already elapsed, in step S508, the auto-off control unit 6 is instructed to reduce the duty of irradiation of the laser beams L emitted from the laser light source 13 to 50% (corresponding to the power changing element and the controlling element).

In next step S509, in the same way as step S506, the data outputted from the bar width counter 16 is monitored, and there is checked whether the bar width data including the pattern corresponding to the bar code 21 is detected. Then, if the bar width data is detected, it is judged that the bar code 21 is scanned with the laser beams L. Hence, the processing is returned to step S503 in order to restore the duty of irradiation of the laser beams L emitted from the laser light source 13 to 100%. However, the numerical values (the time a, the time b and the time c) are initialized in step S510 when the processing returns to step S503, and therefore the "time a" hereafter becomes 10 seconds, the "time b" becomes 9 minutes and 50 seconds, and the "time c" becomes 20 minutes.

Whereas if no bar width data is detected, it is checked in step S507 whether the time elapsed without detecting the bar width data after the completion of checking in step S507 reaches the time b (9 minutes and 50 seconds, or 10 seconds).

Then, if the time b (9 minutes and 50 seconds, or 10 seconds) is not reached, in step S516 whether an object approaches the front of the proximity sensor 8 is checked based on the notice given from the proximity sensor control unit 7. More specifically, nine pieces of latest values among the external light quantity values obtained by sampling at every interval of γ (100 ms) are averaged, thereby an "average value ε" is obtained. Next, the external light quantity at the present time is sampled at the sampling interval of 10 ms, and the sampled light quantity is set to a "sampled value ζ". After the above processing, there is checked whether the above-described "determination threshold value", the "average value 2" and the "sampled value ζ" satisfy the above-described formula (1).

If formula (1) is satisfied, it is judged that the present light quantity (which is the sampled value) is not more than X% (90%) of the light quantity previous to the point of time (the average value ε). Accordingly, it is judged that an object approaches the front of the external light sensor 8. In this case, the processing is returned to S503 in order to restore the duty of irradiation of the laser beams L outputted from the laser light source 13 to 100% (corresponding to the restoring element and the restoring element). This case does not, however, imply that the bar width data itself is detected, and therefore, the numerical values (the time a, the time b and the time c) are not initialized. Accordingly, the times set to the numerical values (the time a, the time b and the time c) remain as they are. Whereas if it is judged that no object approaches the front (if the external light quantity exceeds X%), the processing returns to step S509 to detect the bar width data.

On the other hand, it is judged that the elapsed time has already reached the time b (9 minutes and 50 seconds, or 10 seconds) in step S511, the processing proceeds to step S517. In step S517, the emission of the laser beams L from the laser light source 13 is completely stopped (corresponding to the control element).

In next step S518, whether or not an object approaches the front of the proximity sensor 8 is checked based on the notice given from the proximity sensor control unit 7. More specifically, in the same way as step S516, the "average value ε" and the "sampled value ζ" are obtained. After the values are obtained, there is judged whether the above-described "determination threshold value", the "average value ε" and the "sampled value ζ" satisfy the following formula (2).

If formula (2) is satisfied, it is judged that the present light quantity (which is the sampled value) is not more than Y% (80%) of the light quantity previous to the point of time (which is the average value ε). Accordingly, it is judged that an object approaches the front of the external light sensor 8. In this case, the processing is returned to S503 in order to restore the duty of irradiation of the laser beams L emitted from the laser light source 13 to 100% (corresponding to the restoring element). This case does not, however, imply that the bar width data itself is detected, and therefore, no numerical values (the time a, the time b and the time c) are initialized. Accordingly, the times set to the "time a", the "time b" and the "time c" remain as they are. Whereas if it is judged that no object approaches the front (if the external light quantity exceeds Y%), the processing proceeds to step S519.

Checked in step S519 is whether or not the time elapsed without detecting the proximity of the object after the completion of the checking in step S511 reaches the time c (20 minutes, or 10 seconds). Then, if the time c (20 minutes, or 10 seconds) is not yet reached, the processing returns to step S518. Contrastingly, it is judged that the elapsed time has already reached the time c (20 minutes, or 10 seconds), the processing proceeds to step S520. In step S520, the motor 12 stops rotating (corresponding to the control element).

In step S521, whether an object approaches the front of the proximity sensor 8 is checked based on the notice given from the proximity sensor control unit 7. More specifically, in the same manner as step S516, the "average value ε" and the "sampled value ζ" are obtained. After the obtaining, there is checked whether the above-described "determination threshold value", "average value ε" and the "sampled value ζ" satisfy the above formula (3).

If formula (3) is satisfied, it is judged that the present light quantity (which is the sampled value) is not more than 50% of the light quantity previous to the point of time (which is the average value ε). Accordingly, it is judged that an object approaches the front of the external light sensor 8. In this case, the processing returns to step S501 in order to resume both of the rotations of the motor 12 and the emission of the laser beams L from the laser light source 13 (corresponding to the restoring element and the restoring element). In this case, the numerical values (the time a, the time b and the time c) are initialized, and hence the "time a" is set to 10 sec., the "time b" is set to 9 minutes and 50 seconds, and the "time c" is set to 20 minutes. Whereas if it is judged that no object approaches the front (if the external light quantity exceeds Y%), the checking process in step S521 is repeated.

Next, the operation of the bar code reading apparatus in the sixth embodiment will be explained. Now, it is assumed that no bar width data is absolutely detected after the bar width data has been demodulated last time. Hereupon, the duty of irradiation of the laser beams L emitted from the laser light source 13 is reduced down to 50% when elapsed time reaches 10 sec. since the bar width data has been demodulated last time.

During such a period for which the duty of irradiation of the laser beams L is 50% (status B), the bar width counter 16 is capable of generating the bar width data. When the bar width data is obtained, the duty of irradiation of the laser beams L is set back to 100% in order to resume the reading of the bar code (S509).

During the period for which the duty of irradiation of the laser beams L is 50% (status B), the proximity sensor 8 is also capable of detecting a proximity of an object (S516). The determination threshold value for the proximity sensor 8 to detect the proximity of an object used during that period is 90% of the average value (the average value ε) of the normal external light quantity.

When the time elapsed since the timing of becoming the status B reaches 9 minutes and 50 seconds, the emission of the laser beams L is completely stopped (step S517). During such a period for which the emission of the laser beams 1 is completely stopped (status C), what is possible is only the detection of the proximity of the object by the proximity sensor 8 (step S518). The determination threshold value for detecting the proximity of the object by the proximity sensor 8 used during that period is 80% of the average value (the average value ε) of the normal external light quantity.

When the time elapsed since the timing of becoming the status C reaches 20 minutes, the motor 12 also stops rotating (step S520). During such a period that the motor 12 stops rotating (status D), what is possible is only the detection of the proximity of an object by the proximity sensor 8 (step S521). The determination threshold value for detecting the proximity of the object by the proximity sensor 8 used during that period is 50% of the average value (the average value ε) of the normal external light quantity.

When the proximity sensor 8 detects the proximity of the object during a period for which it is the status-B through status-D, the time a corresponding to the period for which the duty of irradiation of the laser beams L is 100% is changed to 5 seconds, the time b corresponding to the period for which the duty of irradiation of the laser beams L is 50% is changed to 10 sec., and the time c corresponding to the period for which both the emission of the laser beams L and the rotations of the motor 12 remain stopped (step S504). Then, if no bar width data is thereafter detected, it is possible to determine that there must be a misdetection by the proximity sensor 8. Hence, hereafter, the laser beams L are emitted at the duty of irradiation of 100% for only 5 seconds and also emitted at the duty of irradiation of 50% for only 10 seconds. Thereafter, the emission of the laser beams L is halted, and, after the time of 10 sec. has elapsed, the motor 12 stops rotating. A futile emission of the laser beams L and futile rotations of the motor 12 can be thereby prevented.

Contrastingly, when the bar width data is detected after the proximity sensor 8 has detected the proximity of an object, the "time a" is set back to the initial value (10 sec.), and the "time b" is also set back to the initial value (9 minutes and 50 seconds). The "time c" is also set back to the initial value (20 minutes).

Note that in the determination of about the proximity of the object in steps S516, S518 or step S521, the "sampled value ζ" substituted into the formulae (1) through (3) may be replaced with an average value of the latest three values among the external light quantity values sampled at the interval of 10 ms.

A seventh embodiment of the present invention is, as compared with the third embodiment discussed above, characterized by changing the duty of irradiation of the laser beams L only when the average light quantity is less than a predetermined value. Other configurations in the seventh embodiment are absolutely the same as those in the third embodiment.

Figure 15:
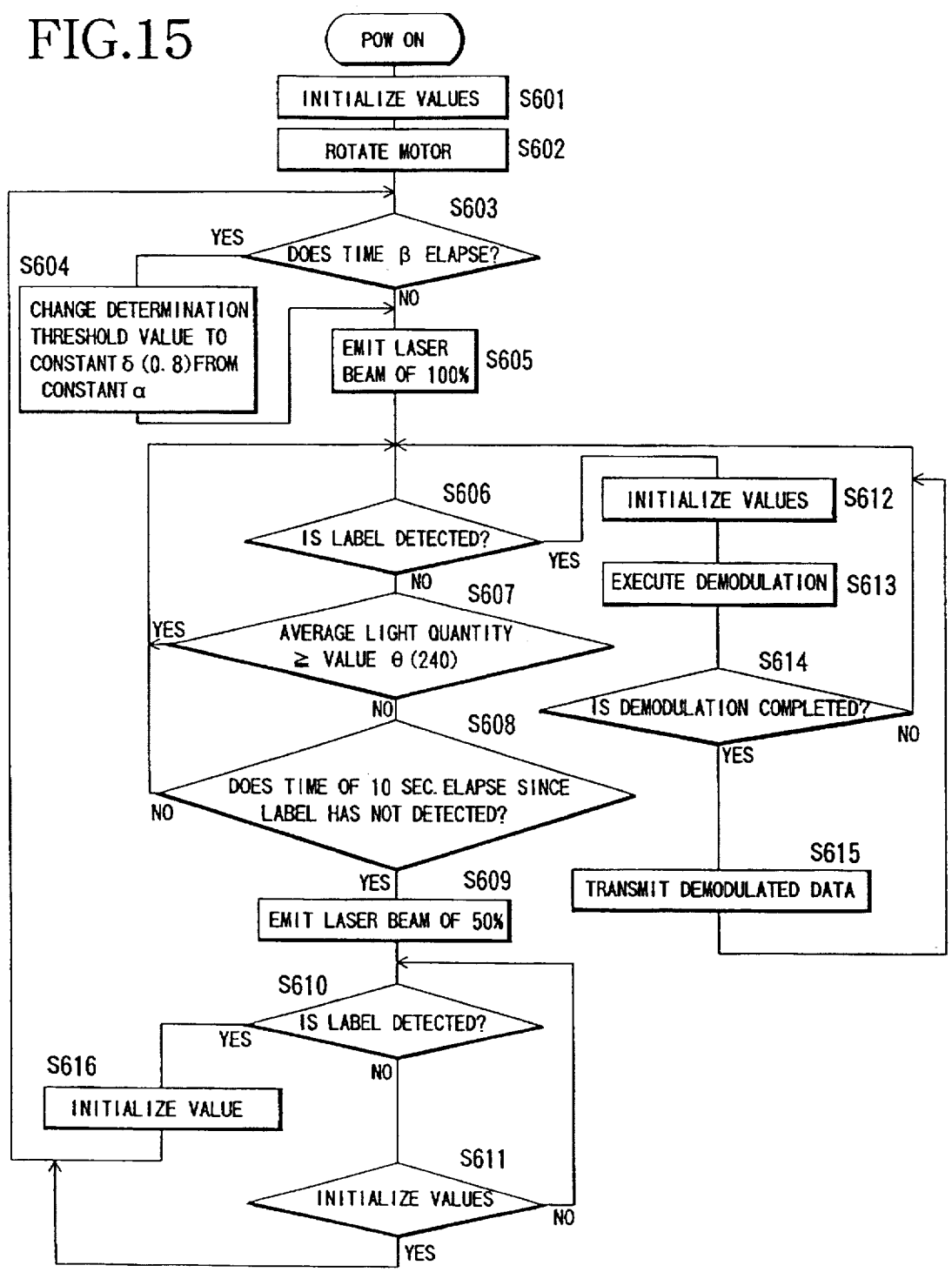
FIG. 15 is a flowchart showing a bar code demodulating process and the laser scan control process in a seventh embodiment of the present invention.

FIG. 15 shows the processes executed by the CPU 1 in the seventh embodiment. These processes start with the power supply to the bar code reading apparatus. In first step S601, each of the numeral values used for those processes is initialized. More specifically, the "determination threshold value" used when a proximity of an object detected based on a reduction in the external light quantity measured by the proximity sensor 8 is set to a constant α (0.9). If this "determination threshold value" is set to the constant value α (0.9), the detection sensitivity of the external light sensor 8 comes to 90%. Further, the "time β" corresponding to a time until the "determination threshold value" is changed is set to 10 minutes. Set further to 100 ms is the "interval γ" corresponding to a time interval for sampling the quantity of the light detected by the proximity sensor 8 for measuring an average value of the external light quantities. Moreover, the "value θ" corresponding to a determination reference value (which is a digital value) of the average light quantity is set to 240 counts. Then, the external light sampling at the interval γ (100 ms) is started, and a monitoring timer for monitoring an elapsed time is also started. This monitoring timer may be a software timer.

In next step S602, the motor 12 starts rotating, and an unillustrated polygon mirror in the scan optical system 14 is rotationally driven.

In next step S603, whether an elapsed time monitored by the monitoring timer reaches the time β (10 minutes) is checked. Then, if the time β (10 minutes) is not yet reached, the processing proceeds directly to step S605. Whereas if the time β (10 minutes) has already been reached, in step S604, the "determination threshold value " is changed from the constant α (0.9) to a constant δ (0.8), and the detection sensitivity of the external light sensor 8 is set to 80% (which corresponds to the sensitivity decreasing element). Thereafter, the processing proceeds to step S605.

In step S605, the laser light source 13 emits the laser beams L at a duty of irradiation of 100%.

In next step S606, the data outputted from the bar width counter 16 is monitored, and it is checked whether or not the bar width data including the pattern corresponding to the bar code 21 is detected. Then, if the bar width data is detected, it is Judged that the bar code 21 is scanned with the laser beams L, and hence the processing proceeds to step S612. In step S612, in absolutely the same manner as step S601, a variety of numerical values used in this processing are initialized. In next step S613, the demodulation based on the detected bar width data is carried out (corresponding to the demodulating element). In other words, the bar width data is converted into corresponding data. Checked in next step S614 is whether the demodulation in step S613 has completed or not. Then, if the demodulation is not completed, the processing is returned to step S606 to execute a process for the next bar width data. Contrastingly if the demodulation has completed, in step S615, the demodulated data is transmitted via the interface circuit 9 to the host computer 22. When this transmission has done, the processing is returned to step S606 to execute a process for the next bar width data.

If no bar width data is detected in step S606, it is checked in step S607 whether the latest average of the external light quantity is not less than the predetermined determination reference value (a value θ). More specifically, nine pieces of latest values among the external light quantity values obtained by sampling at every interval of γ (100 ms) are averaged, thus an "average light quantity" is calculated. Thereafter, the thus calculated "average light quantity" is compared with the determination reference value (the value θ). Then, if the "average light quantity" is equal to the determination reference value (the value θ) or more, this is conceived to be beyond a controllable range of the external light sensor 8, and the processing returns to step S606 to prevent the misdetection.

Contrastingly, if the "average light quantity" is less than the determination reference value (the value θ), it is checked in step S608 whether the time of 10 sec. has elapsed since the bar width data has detected last time. Then, if the time of 10 sec. has not yet elapsed, the processing goes back to step S606 to check an existence of the bar width data. Contrastingly if the time of 10 sec. has already elapsed, in step S609, the auto-off control unit 6 is instructed to reduce the duty of irradiation of the laser beams L emitted from the laser light source 13 to 50% (corresponding to the power changing element and the controlling element).

In next step S610, in the same way as step S606, the data outputted from the bar width counter 16 is monitored, and there is checked whether the bar width data including the pattern corresponding to the bar code 21 is detected. Then, if the bar width data is detected, it is judged that the bar code 21 is scanned with the laser beams L. Hence, the processing is returned to step S603 in order to restore the duty of irradiation of the laser beams L outputted from the laser light source 13 to 100%. When the processing returned to step S603, the numerical values (which are the determination threshold values) are initialized in step S616, and hence the detection sensitivity of the proximity sensor 8 hereafter becomes 90%.

Whereas if no bar width data is detected, in step S611, whether an object approaches the front of the proximity sensor 8 is checked based on the notice given from the proximity sensor control unit 7. More specifically, nine pieces of latest values among the external light quantity values obtained by sampling at every interval of γ (100 ms) are averaged, thereby the latest "average value ε" is obtained. Next, the external light quantity at the present time is sampled at the sampling interval of 10 ms, and the sampled light quantity is set to the "sampled value ζ". After the above processing, there is checked whether the above-described "determination threshold value", the "average value ε" and the "sampled value ζ" satisfy the formula (1) given above.

If the above formula (1) is satisfied, it is judged that the present light quantity (which is the sampled value) is not more than X% (which is 90% when the determination threshold value is set to the constant α or 80% when it is set to the constant δ) of the light quantity previous to that point of time (which is the average value ε). Accordingly, it is judged that an object approaches the front of the external light sensor 8. Then, if it is judged that an object approaches the front (if the external light quantity is X% or under), the processing is returned to S603 in order to restore the duty of irradiation of the laser beams L emitted from the laser light source 13 to 100%. This case does not, however, imply that the bar width data itself is detected, and therefore, no numerical value (threshold value) is initialized. Accordingly, the detection sensitivity of the proximity sensor 8 remains as it is. Contrastingly, if it is judged that no object approaches the front (if the external light quantity exceeds X%), the processing returns to step S610.

Next, the operation of the bar code reading apparatus in the seventh embodiment will be discussed. Now, it is assumed that no bar width data is absolutely detected after the bar width data has been demodulated last time. In this case, the duty of irradiation of the laser beams L emitted from the laser light source 13 is reduced to 50% when elapsed time reaches 10 sec. since the bar width data has been demodulated last time (S609).

During such a period for which the duty of irradiation of the laser beams L is 50%, the bar width counter 16 is capable of generating the bar width data. When the bar width data is obtained, the duty of irradiation of the laser beams L is set back to 100% in order to resume the reading of the bar code (S605).

Further, during the period for which the duty of irradiation of the laser beams L is 50%, the proximity sensor 8 is also capable of detecting a proximity of an object (S611). In the initial status, the determination threshold value for the proximity sensor 8 to detect the proximity of an object is 90% of the average value (the average value ε) of the normal external light quantity.

If the bar width data is detected after the proximity sensor 8 has detected the proximity of an object, in step S612, the "determination threshold value" is initialized. If the bar width data is not detected after the proximity sensory 8 has detected the proximity of an object, however, this can be recognized as a misdetection, and therefore the "determination threshold value" is not initialized. Then, when the elapsed time reaches 10 minutes (the time β) while no initialization of the "determination threshold value" is performed, in step S604, the "determination threshold value" becomes 80% of the average value (the average value ε) of the normal external light quantity. In other words, the detection sensitivity of the proximity sensor 8 decreases. This is due to the fact that the possibility of reading the bar code 21 becomes lower as the elapsed time becomes longer since the bar width data was detected last time, and the fact that there relatively increases the possibility of misdetecting an object other than the goods 20 including the bar code 21 if the determination threshold value remains as it is. Incidentally, as discussed above, the "determination threshold value" is, even after reduced to 80%, immediately initialized in step S612 and set back to 90% on the condition that the bar width data is detected.

If the average of the light quantity of the external light is equal to the determination reference value (the value θ) or larger, it is conceived to be beyond the controllable range of the external light sensor 8, and the duty of irradiation of the laser beams L remains to be 100% irrespective of whether the bar width data is detected or not (S607). In this case, the processes from step S608 onward are not executed, and hence the duty of irradiation of the laser beams L is not changed to 50%. Further, it is therefore unnecessary for the external light sensor 8 to detect the proximity of an object.

Moreover, in the above-described determination about the proximity of the object in step S611, the "sampled value ζ" substituted into the formula (1) may be replaced with an average value of the latest three values among the external light quantity values sampled at the interval of 10 ms.

An eighth embodiment of the present invention is, as compared with the third embodiment discussed above, characterized by changing no duty of irradiation of the laser beam L if the average light quantity is lower than a predetermined value. Other configurations in the eighth embodiment are absolutely the same as those in the third embodiment.

Figure 16:
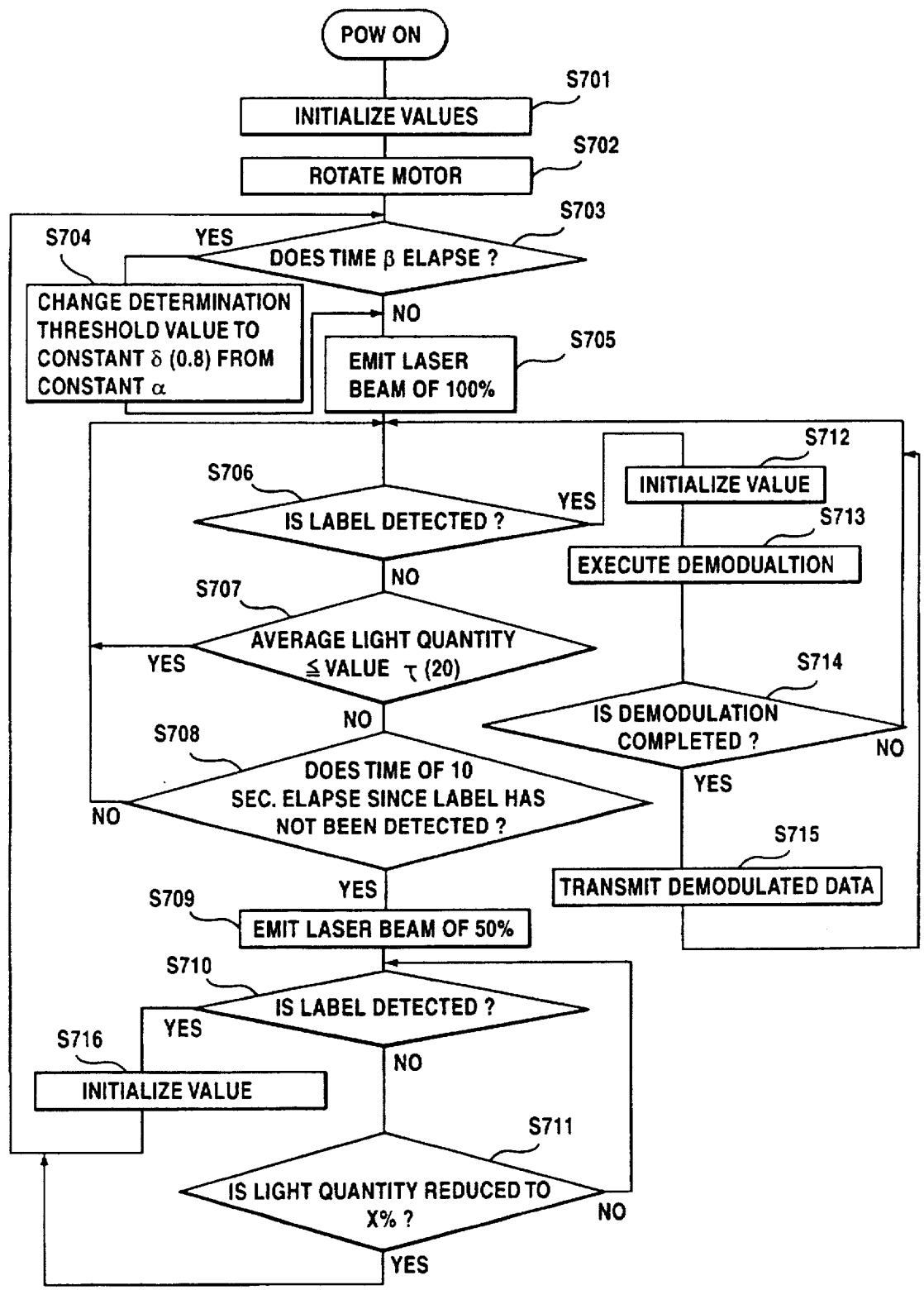
FIG. 16 is a flowchart showing a bar code demodulating process and the laser scan control process in an eighth embodiment.

FIG. 16 shows processes executed by the CPU 1 in the eighth embodiment. These processes start with the power supply to the bar code reading apparatus. In first step S701, each of the numeral values used for those processes is initialized. More specifically, the "determination threshold value" used when a proximity of an object detected based on a reduction in the external light quantity measured by the proximity sensor 8 is set to a constant α (0.9). If this "determination threshold value" is set to the constant α (0.9), the detection sensitivity of the external light sensor 8 comes to 90%. Further, the "time β" corresponding to a time until the "determination threshold value" is changed is set to 10 minutes. Set further to 100 ms is the "interval γ" corresponding to a time interval for sampling the quantity of the light detected by the proximity sensor 8 for measuring an average value of the external light quantities. Moreover, the "value τ" corresponding to a determination reference value (which is a digital value) of the average light quantity is set to 20 counts. Then, the external light sampling at the interval γ (100 ms) is started, and a monitoring timer for monitoring an elapsed time is also started. This monitoring timer may be a software timer.

In step S702, the motor 12 starts rotating, and the polygon mirror in the scan optical system 14 is rotationally driven.

In step S703, whether an elapsed time monitored by the monitoring timer reaches the time β (10 minutes) is checked. Then, if the time β (10 minutes) is not yet reached, the processing proceeds directly to step S705. Whereas if the time β (10 minutes) has already been reached, in step S704, the "determination threshold value " is changed from the constant α (0.9) to a constant δ (0.8), and the detection sensitivity of the external light sensor 8 is set to 80% (which corresponds to the sensitivity decreasing element). Thereafter, the processing proceeds to step S705.

In step S705, the laser light source 13 emits the laser beams L at a duty of irradiation of 100%.

In next step S706, the data outputted from the bar width counter 16 is monitored, and it is checked whether or not the bar width data including the pattern corresponding to the bar code 21 is detected. Then, if the bar width data is detected, it is judged that the bar code 21 is scanned with the laser beams L, and hence the processing proceeds to step S712. In step S712, in absolutely the same manner as step S701, a variety of numerical values used in this processing are initialized. In next step S713, the demodulation based on the detected bar width data is carried out (corresponding to the demodulating element). In other words, the bar width data is converted into corresponding data. Checked in step S714 is whether the demodulation in step S713 has completed or not. Then, if the demodulation has not completed, the processing is returned to step S706 to execute a process for the next bar width data. Contrastingly if the demodulation has completed, in step S715, the demodulated data is transmitted via the interface circuit 9 to the host computer 22. When this transmission has done, the processing is returned to step S706 to execute a process for the next bar width data.

If no bar width data is detected in step S706, it is checked in step S707 whether the latest average of the external light quantity is not more than a predetermined determination reference value (a value τ). More specifically, nine pieces of latest values among the external light quantity values obtained by sampling at every interval of γ (100 ms) are averaged, thus an "average light quantity" is calculated. Thereafter, the thus calculated "average light quantity" is compared with the determination reference value (the value τ). Then, if the "average light quantity" is equal to the determination reference value (the value τ) or under, this is conceived to be beyond the controllable range of the external light sensor 8, and the processing returns to step S706 to prevent the misdetection.

Contrastingly, if the "average light quantity" exceeds the determination reference value (the value τ), it is checked in step S708 whether the time of 10 sec. has elapsed since the bar width data has detected last time. Then, if the time of 10 sec. has not yet elapsed, the processing goes back to step S706 to check an existence of the bar width data. Contrastingly if the time of 10 sec. has already elapsed, in step S709, the auto-off control unit 6 is instructed to reduce the duty of irradiation of the laser beams L emitted from the laser light source 13 to 50% (corresponding to the power changing element and the controlling element).

In next step S710, in the same way as step S706, the data outputted from the bar width counter 16 is monitored, and there is checked whether the bar width data including the pattern corresponding to the bar code 21 is detected. Then, if the bar width data is detected, it is judged that the bar code 21 is scanned with the laser beams L. Hence, the processing is returned to step S703 in order to restore the duty of irradiation of the laser beams L emitted from the laser light source 13 to 100%. When the processing returned to step S703, the numerical values (which are the determination threshold values) are initialized in step S716, and hence the detection sensitivity of the proximity sensor 8 hereafter becomes 90%.

If no bar width data is detected, in step S711, whether an object approaches the front of the proximity sensor 8 is checked based on the notice given from the proximity sensor control unit 7. More specifically, nine pieces of latest values among the external light quantity values obtained by sampling at every interval of γ (100 ms) are averaged, thereby the latest "average value ε" is obtained. Next, the external light quantity at the present time is sampled at the sampling interval of 10 ms, and the sampled light quantity is set to the "sampled value ζ". After the above processing, there is checked whether the above-described "determination threshold value", the "average value ε" and the "sampled value ζ" satisfy the formula (1) given above.

If the above formula (1) is satisfied, it is judged that the present light quantity (which is the sampled value) is not more than X% (which is 90% when the determination threshold is set to the constant α or it is set to 80% when the constant δ) of the light quantity previous to the point of time (which is the average value ε). Accordingly, it is judged that an object approaches the front of the external light sensor 8.

Then, if it is judged that an object approaches (if the external light quantity is X% or under, the processing is returned to S703 in order to restore the duty of irradiation of the laser beams L emitted from the laser light source 13 to 100% (corresponding to the restoring element and the restoring element). This case does not, however, imply that the bar width data itself is detected, and therefore, no numerical value (the determination threshold value) is initialized. Accordingly, the detection sensitivity of the proximity sensor 8 remains as it is. Contrastingly, if it is judged that no object approaches the front (if the external light quantity exceeds X%), the processing returns to step S710.

Next, the operation of the bar code reading apparatus in the eighth embodiment will be discussed. It will be assumed that no bar width data is absolutely detected after the bar width data has been demodulated last time. Hereupon, the duty of irradiation of the laser beams L emitted from the laser light source 13 is reduced to 50% when elapsed time reaches 10 sec. since the bar width data has been demodulated last time (S709).

During such a period for which the duty of irradiation of the laser beams L is 50%, the bar width counter 16 is capable of generating the bar width data. When the bar width data is obtained, the duty of irradiation of the laser beams L is set back to 100% in order to resume the reading of the bar code (S705).

Further, during the period for which the duty of irradiation of the laser beams L is 50%, the proximity sensor 8 is also capable of detecting a proximity of an object (S711). In the initial status, the determination threshold value for the proximity sensor 8 to detect the proximity of an object is 90% of the average value (the average value є) of the normal external light quantity.

If the bar width data is detected after the proximity sensor 8 has detected the proximity of an object, in step S712, the "determination threshold value" is initialized. If the bar width data is not detected after the proximity sensory 8 has detected the proximity of an object, however, this can be recognized as a misdetection, and therefore the "determination threshold value" is not initialized. Then, when the elapsed time reaches 10 minutes (the time β) while no initialization of the "determination threshold value" is performed, in step S704, the "determination threshold value" becomes 80% of the average value (the average value є) of the normal external light quantity. In other words, the detection sensitivity of the proximity sensor 8 decreases. This is due to the fact that the possibility of reading the bar code 21 becomes lower as the elapsed time becomes longer since the bar width data was detected last time, and the fact that there relatively increases the possibility of misdetecting an object other than the goods 20 including the bar code 21 if the determination threshold value remains as it is. Incidentally, as discussed above, the "determination threshold value" is, even after reduced to 80%, immediately initialized in step S712 and then set back to 90% on the condition that the bar width data is detected.

Incidentally, if the average light quantity of the external light is equal to the determination reference value (the value τ) or under, it is conceived to be beyond the controllable range of the external light sensor 8, and the duty of irradiation of the laser beams L remains to be 100% irrespective of whether the bar width data is detected or not (S707). I this case, the processes from step S708 onward are not executed, and hence the duty of irradiation of the laser beams L is not changed to 50%. Further, it is therefore unnecessary for the external light sensor 8 to detect the proximity of an object.

Moreover, in the above-described determination about the proximity of the object in step S711, the "sampled value 3" substituted into the formula (1) may be replaced with an average value of the latest three values among the external light quantity values sampled at the interval of 10 ms.

Figure 17:
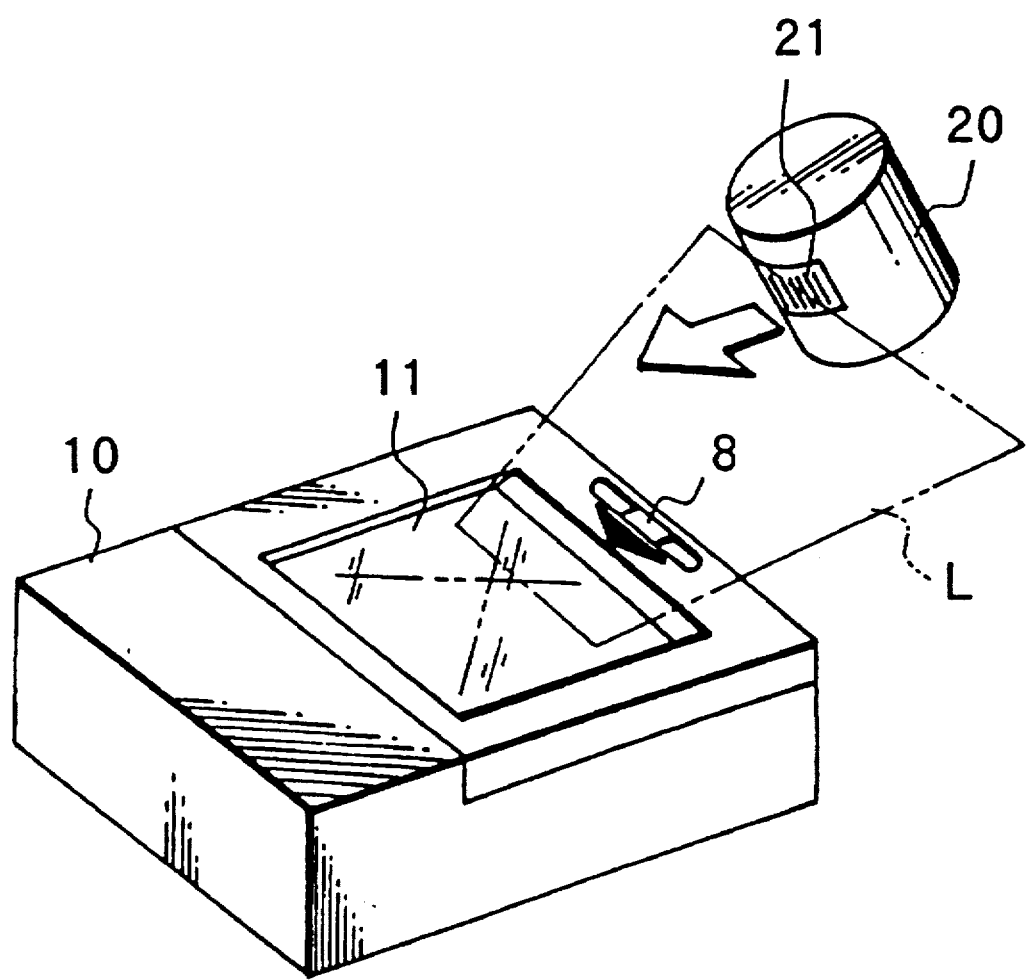
FIG. 17 is a perspective view showing another form of a cash register apparatus to which the bar code reading apparatus of the present invention is applied.

In the respective embodiments discussed above, the bar code reading apparatus may take a form illustrated in FIG. 17. To be specific, the bar code reading apparatus may be disposed so that a glass window 11 transmitting the laser beams L is directed upwards. In this case, it follows that the goods 20 is exposed to the laser beam L at the position above the glass window 11.

Further, in the respective embodiments discussed above, the condition for setting the sensitivity of the external light sensor back to the initial value may be a completion of the demodulation of a half of the bar code in the case that the bar code to be detected is a UPC code, or may also be a completion of the demodulations of all the characters of the bar code in the case that the bar code to be detected is a second code.

Moreover, the embodiments discussed above may be constructed so that a time until the duty of irradiation of the laser beams L is changed, a time until the emission of the laser beams L is completely stopped, and a time until the rotations of the motor 12 are stopped can be initialized to arbitrary values.

Note that an instant value itself of the light quantity of the laser beams L may be attenuated instead of the duty of irradiation of the laser beams L reduced in the respective embodiments discussed above.

The bar code reading apparatus according to the present invention having the above-described constructions optically detect an object marked with the bar code. It is therefore possible to start the emission of the laser beams and also start the driving of the scan optical system without an operator aware of the existence of the sensor. Furthermore, after temporarily reading the bar code, the detection sensitivity decreases corresponding to a length of a period for which the reading process of the bar code is discontinued. Consequently, the troubles caused by the misdetections can be reduced.

This invention being thus described, it will be obvious to one of skill in the art that the invention may be varied in a number ways. Such variations are not to be regarded as a departure from the spirit and scope of the invention, and all such medications as would be obvious to one skilled in the art are intended to be included within the scope of the following claims.

We claim:

1. A bar code reading apparatus comprising:

a laser light source for emitting a laser beam;

a scan optical system deflecting the laser beam toward a read position;

demodulating means for demodulating data encoded in a bar code marked on an object disposed in the read position based upon a reflected portion of the laser beam reflected from the bar code;

power changing means for changing power of the laser beam from a normal level after predetermined time has elapsed since said demodulating means performed a previous demodulation;

an optical sensor optically detecting an object disposed in the read position;

restoring means for restoring the power of the laser beam to the normal level when said optical sensor detects an object; and sensitivity decreasing means for decreasing sensitivity of said optical sensor in accordance with an elapsed time since said demodulating means performed the previous demodulation.

2. A bar code reading apparatus comprising:

a laser light source for emitting a laser beam;

a scan optical element rotating to deflect the laser beam toward a read position;

driving means for driving said scan optical element;

demodulating means for demodulating data encoded in a bar code marked on an object disposed in the read position based upon a reflected portion of the laser beam reflected from the bar code;

control means for at first changing power of the laser beam from a normal level, next stopping an emission of the laser beam from said laser light source, and subsequently stopping the driving of said scan optical element by said driving means in accordance with an elapsed time since said demodulating means performed a previous demodulation last time;

an optical sensor optically detecting an object disposed in the read position;

restoring means for restoring the power of the laser beams to the normal level, and restoring the driving of said scan optical element by said driving means when said optical sensor detects an object; and sensitivity decreasing means for decreasing stepwise sensitivity of said optical sensor respectively when the power of the laser beams is changed from the normal level, when the emission of the laser beam is stopped, and when the driving of said scan optical element is stopped.

3. A bar code reading apparatus according to claim 1, further comprising frequency measuring means for measuring a frequency at which said demodulating means demodulates the data, and wherein said sensitivity decreasing means decreases the sensitivity by said optical sensor each time the frequency measured by said frequency measuring means decreases and increases the sensitivity each time the frequency increases.

4. A bar code reading apparatus according to claim 3, wherein said sensitivity decreasing means includes a table in which the elapsed time since said demodulating means executed the previous demodulation and the frequency measured by said frequency measuring means is combined and made to correspond to sensitivity of said optical sensor, said sensitivity decreasing means reading the sensitivity from the table.

5. A bar code reading apparatus according to claim 1, wherein said optical sensor includes a light emitting element for irradiating an object disposed in the read position with the light beam and a light receiving element for receiving the reflected portion of the light beam reflected from the object, said light emitting element and said light receiving element disposed side by side.

6. A bar code reading apparatus according to claim 1, wherein said optical sensor is an external light sensor for detecting external light from an external light source incident via the read position which is intercepted by the object.

7. A bar code reading apparatus according to claim 6, wherein said optical sensor compares an average of light quantities obtained by measuring the external light several times with a latest external light quantity, and assumes an object to be detected when a rate of the latest external light quantity compared to an average light quantity is a predetermined level or under.

8. A bar code reading apparatus according to claim 7, wherein said optical sensor is configured such that an external light quantity measurement interval for obtaining the average is set larger than a measurement interval for measuring the latest external light quantity.

9. A bar code reading apparatus according to claim 8, wherein the average light quantity obtained by measuring the external light beams several times is compared with a second average of light quantities obtained by measuring the latest external light quantities several times.

10. A bar code reading apparatus according to claim 6, wherein said power changing means is configured to change a power of the laser beams only when an average light quantity obtained by measuring the external light several times is less than a predetermined level.

11. A bar code reading apparatus according to claim 6, wherein said power changing means is configured to change a power of the laser beams only when an average light quantity obtained by measuring the external light several times is larger than a predetermined level.

12. A bar code reading apparatus comprising:

a laser light source for emitting a laser beam;

a scan optical system deflecting the laser beam toward a read position;

demodulating means for demodulating data encoded in a bar code marked on an object disposed in the read position based upon of a reflected beam of the laser beam reflected on the bar code;

power changing means for changing power of the laser beam from a normal level after predetermined time has elapsed since said demodulating means performed a previous demodulation;

an optical sensor optically detecting an object disposed in the read position;

restoring means for restoring the power of the laser beams to the normal level when said optical sensor detects an object; and sensitivity decreasing means for decreasing sensitivity of said optical sensor in accordance with a number of times with which said optical sensor detects an object without any demodulation executed by said demodulating means.

13. A bar code reading apparatus comprising:

a laser light source for emitting a laser beam;

a scan optical element rotating to deflect the laser beam toward a read position;

driving means for driving said scan optical element;

demodulating means for demodulating data encoded in a bar code marked on an object disposed in the reading position based upon a reflected beam of the laser beam reflected on the bar code;

control means for at first changing power of the laser beam from a normal level, next stopping an emission of the laser beam from said laser light source, and subsequently stopping the driving of said scan optical element by said driving means in accordance with an elapsed time since said demodulating means performed a previous demodulation;

an optical sensor optically detecting an object disposed in the read position;

restoring means for restoring the power of the laser beam to the normal level, and restoring the driving of said scan optical element by said driving means when said optical sensor detects an object; and status transition time modification means for shortening a time before emission of the laser beams is stopped when said optical sensor detects an object without any demodulation executed by said demodulating means.

14. A bar code reading apparatus comprising:

a laser light source for emitting a laser beam;

a scan optical element rotating to deflect the laser beam toward a read position;

driving means for driving said scan optical element;

demodulating means for demodulating data encoded in a bar code marked on an object disposed in the reading position based upon a reflected beam of the laser beam reflected on the bar code;

control means for at first changing power of the laser beam from a normal level, next stopping an emission of the laser beam from said laser light source, and subsequently stopping the driving of said scan optical element by said driving means in accordance with an elapsed time since said demodulating means performed a previous demodulation;

an optical sensor optically detecting an object disposed in the read position;

restoring means for restoring the power of the laser beam to the normal level, and restoring the driving of said scan optical element by said driving means when said optical sensor detects an object; and status transition time modification means for shortening, when said optical sensor detects an object without any demodulation executed by said demodulating means, a time until said power of the laser beam is changed a time until the emission of the laser beam is stopped, and a time until the driving of said scan optical element by said driving means is stopped.

* * * * *